US010824513B1

(12) United States Patent
Chandrashekhara et al.

(10) Patent No.: US 10,824,513 B1
(45) Date of Patent: Nov. 3, 2020

(54) PROCESSING INPUT/OUTPUT OPERATIONS WHILE SNAPSHOT AND EXTENT COPY OPERATIONS ARE IN PROGRESS FOR A LOGICAL STORAGE VOLUME

(71) Applicant: EMC IP Holding Company LLC, Hopkinton, MA (US)

(72) Inventors: Sandeep Chandrashekhara, Shrewsbury, MA (US); David T. Tsang, Sudbury, MA (US); Michael Ferrari, Douglas, MA (US); Jeffrey Wilson, Franklin, MA (US); Mark J. Halstead, Holliston, MA (US)

(73) Assignee: EMC IP Holding Company LLC, Hopkinton, MA (US)

( * ) Notice: Subject to any disclaimer, the term of this patent is extended or adjusted under 35 U.S.C. 154(b) by 0 days.

(21) Appl. No.: 16/398,879

(22) Filed: Apr. 30, 2019

(51) Int. Cl.
*G06F 12/00* (2006.01)
*G06F 11/14* (2006.01)
*G06F 3/06* (2006.01)

(52) U.S. Cl.
CPC ......... *G06F 11/1461* (2013.01); *G06F 3/065* (2013.01); *G06F 3/0619* (2013.01); *G06F 3/0644* (2013.01); *G06F 3/0656* (2013.01); *G06F 2201/84* (2013.01)

(58) Field of Classification Search
None
See application file for complete search history.

(56) References Cited

U.S. PATENT DOCUMENTS

| 8,806,154 | B1* | 8/2014 | Gupta | G06F 11/1448 |
| | | | | 711/156 |
| 9,965,216 | B1 | 5/2018 | Jaganathan et al. | |
| 10,185,505 | B1* | 1/2019 | Golden | G06F 3/0619 |
| 10,635,542 | B1* | 4/2020 | Chandrashekhara | |
| | | | | G06F 3/0665 |

(Continued)

OTHER PUBLICATIONS

EMC Corporation, "EMC Solutions Enabler TimeFinder Family (Mirror, Clone, Snap, VP Snap) Version 8.2 and Higher," CLI User Guide, Revision 01, Mar. 2016, 228 pages.

(Continued)

*Primary Examiner* — John A Lane
(74) *Attorney, Agent, or Firm* — Ryan, Mason & Lewis, LLP

(57) ABSTRACT

An apparatus in one embodiment comprises at least one processing device having a processor coupled to a memory. The processing device is configured to maintain, for logical storage volumes of a storage system, device sequence numbers for snapshot and extent copy operations. The processing device is also configured to maintain, for at least one track of the logical storage volumes, a track sequence number representing the state of the track with respect to the snapshot and extent copy operations. The processing device is further configured to receive input/output operations directed to the logical storage volumes from host devices coupled to the storage system while at least one snapshot or extent copy operation for the logical storage volumes is in progress, and to utilize the track sequence numbers and the device sequence numbers to determine processing of the received input/output operations while the snapshot or extent copy operations are in progress.

20 Claims, 18 Drawing Sheets

(56) References Cited

U.S. PATENT DOCUMENTS

| 2010/0023716 A1* | 1/2010 | Nemoto | G06F 3/065 |
| | | | 711/162 |
| 2013/0097399 A1* | 4/2013 | Chhaunker | G06F 3/065 |
| | | | 711/165 |
| 2014/0344526 A1* | 11/2014 | Brown | G06F 11/1458 |
| | | | 711/141 |
| 2017/0154093 A1* | 6/2017 | Shetty | G06F 3/067 |

OTHER PUBLICATIONS

Dell EMC, "Dell EMC PowerMax Reliability, Availability, and Serviceability Technical White Paper," Dell EMC Technical White Paper, Oct. 2018, 32 pages.

Dell EMC, "The Dell EMC PowerMax Family Overview," Dell EMC Engineering, Oct. 2018, 53 pages.

EMC Enterprise Storage Solution, "EMC TimeFinder Product Description Guide," EMC The Enterprise Storage Company, Dec. 1998, 34 pages.

* cited by examiner

PROCESSING INPUT/OUTPUT OPERATIONS WHILE SNAPSHOT AND EXTENT COPY OPERATIONS ARE IN PROGRESS FOR A LOGICAL STORAGE VOLUME

FIELD

The field relates generally to information processing, and more particularly to managing storage of data in storage systems.

BACKGROUND

Applications running on one or more host devices may store and retrieve data from a storage system that includes one or more host interface units or adapters. The storage system may include a plurality of storage devices such as hard disk drives (HDDs), solid state drives (SSDs), etc., along with one or more device interface units or adapters that communicate with the host interface units or adapters. The host devices may access storage provided by the storage system through one or more logical storage volumes rather than interfacing directly with the storage devices of the storage system, where the logical storage volumes may or may not correspond to the actual storage devices that are part of the storage system.

SUMMARY

Illustrative embodiments of the present invention provide techniques for processing input/output operations for logical storage volumes while snapshot and extent copy operations are in progress on the logical storage volumes.

In one embodiment, an apparatus comprises at least one processing device comprising a processor coupled to a memory, wherein the processing device is configured to maintain, for each of two or more logical storage volumes of a storage system, a set of device sequence numbers for snapshot operations associated with that logical storage volume and extent copy operations associated with one or more extents of that logical storage volume, each extent comprising one or more tracks, each track comprising a sequential group of logical addresses of one of the logical storage volumes. The processing device is also configured to maintain, for each track of the two or more logical storage volumes, a track sequence number representing the state of a given track with respect to the snapshot operations and extent copy operations associated with a corresponding one of the two or more logical storage volumes containing the given track. The processing device is further configured to receive one or more input/output operations directed to at least one of the two or more logical storage volumes from one or more host devices coupled to the storage system while at least one snapshot operation or extent copy operation for the two or more logical storage volumes is in progress, and to utilize the track sequence numbers and the sets of device sequence numbers to determine processing of the received input/output operations while said at least one snapshot operation or extent copy operation is in progress.

These and other illustrative embodiments include, without limitation, methods, apparatus, networks, systems and processor-readable storage media.

DETAILED DESCRIPTION

Illustrative embodiments will be described herein with reference to exemplary information processing systems and associated computers, servers, storage devices and other processing devices. It is to be appreciated, however, that embodiments are not restricted to use with the particular illustrative system and device configurations shown. Accordingly, the term "information processing system" as used herein is intended to be broadly construed, so as to encompass, for example, processing systems comprising cloud computing and storage systems, as well as other types of processing systems comprising various combinations of physical and virtual processing resources. An information processing system may therefore comprise, for example, at least one data center or other type of cloud-based system that includes one or more clouds hosting tenants that access cloud resources.

Figure 1:
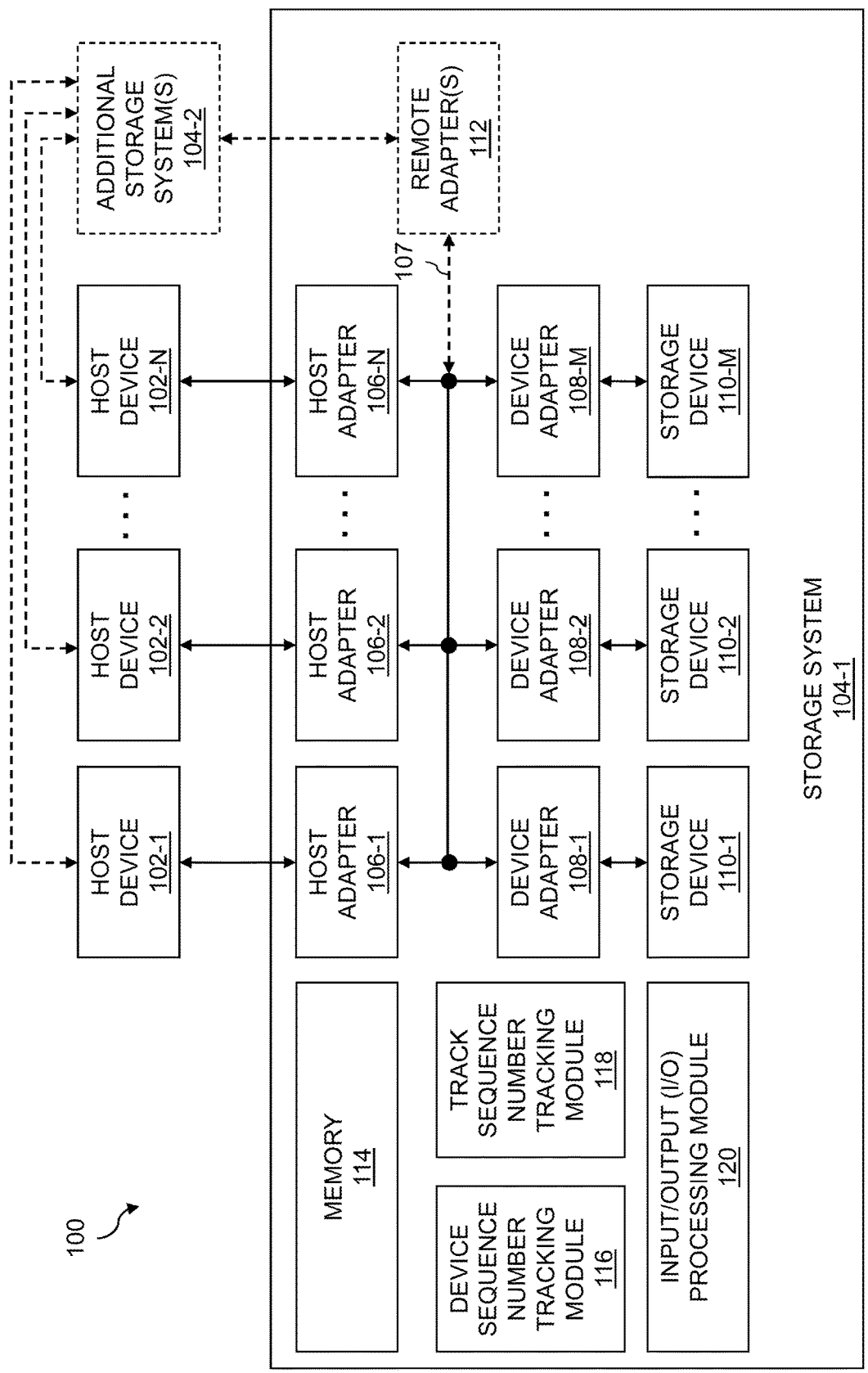
FIG. 1 is a block diagram of an information processing system for processing input/output operations for logical storage volumes while snapshot and extent copy operations are in progress on the logical storage volumes in an illustrative embodiment of the invention.

FIG. 1 shows an information processing system 100 configured in accordance with an illustrative embodiment. The information processing system 100 is assumed to be built on at least one processing platform and provides functionality for processing input/output (I/O) operations for logical storage volumes while snapshot and extent copy operations are in progress on the logical storage volumes. It should be understood that snapshot and extent copy operations are "in progress" when snapshot and extent copy operations are received at a storage system but before such operations are completed within the storage system. The storage system, for example, may accept or acknowledge a snapshot operation or an extent copy operation before such operation is actually completed or de-staged on the logical storage volumes and physical storage devices of the storage system. Snapshot and extent copy operations may also be "in progress" when data that is the subject of a given snapshot or extent copy operation is utilized by one or more other snapshot and extent copy operations.

In this embodiment, the system 100 more particularly comprises a set of host devices 102-1, 102-2, . . . 102-N (collectively, host devices 102) that are coupled to one or more storage systems, including storage system 104-1 and possibly one or more additional storage system(s) 104-2. The storage system 104-1 and additional storage systems 104-2 may be collectively referred to herein as storage systems 104.

The host devices 102 and storage systems 104 may comprise respective processing devices of one or more processing platforms. For example, the host devices 102 and the storage systems 104 can each comprise one or more processing devices each having a processor and a memory, possibly implementing virtual machines and/or containers, although numerous other configurations are possible.

The host devices 102 and the storage systems 104 can additionally or alternatively be part of cloud infrastructure such as Virtustream Enterprise Cloud, Virtustream Storage Cloud, Google Cloud Platform (GCP), Amazon Web Services (AWS), or Microsoft Azure.

The host devices 102 are configured to write data to and read data from the storage systems 104. The host devices 102 and the storage systems 104 may be implemented on a common processing platform, or on separate processing platforms.

The host devices 102 in some embodiments illustratively provide compute services such as execution of one or more applications on behalf of each of one or more users associated with the host devices 102.

The term "user" herein is intended to be broadly construed so as to encompass numerous arrangements of human, hardware, software or firmware entities, as well as combinations of such entities. Compute and/or storage services may be provided for users under a Platform-as-a-Service (PaaS) model, although it is to be appreciated that numerous other cloud infrastructure arrangements could be used. Also, illustrative embodiments can be implemented outside of the cloud infrastructure context, as in the case of a stand-alone computing and storage system implemented within a given enterprise.

The host devices 102 are coupled to the storage system 104-1 via a set of host adapters 106-1, 106-2, . . . 106-N (collectively, host adapters 106). This coupling may be via or over a network, such as a wide area network (WAN), a local area network (LAN), a satellite network, a telephone or cable network, a cellular network, a wireless network such as a WiFi or WiMAX network, or various portions or combinations of these and other types of networks. The network in some embodiments therefore comprises combinations of multiple different types of networks each comprising processing devices configured to communicate using Internet Protocol (IP) or other communication protocols.

As a more particular example, some embodiments may utilize one or more high-speed local networks in which associated processing devices communicate with one another utilizing Peripheral Component Interconnect express (PCIe) cards of those devices, and networking protocols such as InfiniBand, Gigabit Ethernet, Fibre Channel, Small Computer System Interface (SCSI), Internet SCSI (iSCSI), etc. Numerous alternative networking arrangements are possible in a given embodiment, as will be appreciated by those skilled in the art.

Although FIG. 1 shows an arrangement where there is a one-to-one relationship between the host devices 102 and host adapters 106, this is not a requirement. In some cases, a given one of the host devices 102 (e.g., host device 102-1) may connect to the storage system 104-1 through or using multiple host adapters. In other cases, a single one of the host adapters 106 may be configured for connection to two or more of the host devices 102. Although not shown in FIG. 1 for clarity, the additional storage systems 104-2 may similarly comprise one or more host adapters configured for coupling to the host devices 102.

The host adapters 106 may be configured for handling reading and writing of data between the host devices 102 and the storage system 104-1. In some embodiments, the storage system 104-1 comprises a storage array such as a scale-out all-flash content addressable storage array such as an XtremIO™ storage array from Dell EMC of Hopkinton, Mass. Other types of storage arrays, including by way of example VNX®, Symmetrix VMAX®, and PowerMAX storage arrays also from Dell EMC, can be used to implement a storage system in other embodiments.

The term "storage system" as used herein is therefore intended to be broadly construed, and should not be viewed as being limited to content addressable storage systems or flash-based storage systems. A given storage system as the term is broadly used herein can comprise, for example, network-attached storage (NAS), storage area networks (SANs), direct-attached storage (DAS) and distributed DAS, as well as combinations of these and other storage types, including software-defined storage.

Other particular types of storage products that can be used in implementing storage systems in illustrative embodiments include all-flash and hybrid flash storage arrays such as Unity™ software-defined storage products such as ScaleIO™ and ViPR®, cloud storage products such as Elastic Cloud Storage (ECS), object-based storage products such as Atmos®, and scale-out NAS clusters comprising Isilon® platform nodes and associated accelerators, all from Dell EMC. Combinations of multiple ones of these and other storage products can also be used in implementing a given storage system in an illustrative embodiment.

The host adapters 106 may be connected to a set of device adapters 108-1, 108-2, . . . 108-M (collectively, device adapters 108) that are coupled to respective storage devices 110-1, 110-2, . . . 110-M (collectively, storage devices 110) of the storage system 104-1. Each of the storage devices 110 may comprise a hard disk drive (HDD), a solid state drive (SSD), etc. The device adapters 108 provide data to and receive data from the storage devices 110. Although FIG. 1 shows an arrangement where there is a one-to-one relationship between the device adapters 108 and storage devices 110, this is not a requirement. In some embodiments, a given one of the device adapters 108 is used to service (e.g., provide data to and receive data from) two or more of the storage devices 110. In other embodiments, a given one of the storage devices 110 may be coupled to two or more device adapters.

The storage system 104-1 further includes one or more remote adapters 112 (e.g., Remote Data Facility (RDF) adapter units) used to copy data from the storage system 104-1 to one or more other storage systems, such as one or more of the additional storage systems 104-2 (e.g., which are assumed to be similarly configured with one or more remote adapters, host adapters, device adapters, storage devices, etc.). The remote adapters 112 are assumed to be coupled to the host adapters 106 and device adapters 108 via an RDF link 107 for transferring data between the storage system 104-1 and the additional storage systems 104-2.

Although not explicitly shown in FIG. 1, one or more input-output devices such as keyboards, displays or other types of input-output devices may be used to support one or more user interfaces to the host devices 102 and storage systems 104, as well as to support communication between the host devices 102, storage systems 104, and other related systems and devices not explicitly shown.

Logical storage space in the storage system 104-1 that corresponds to the storage devices 110 may be sub-divided into a plurality of volumes or logical devices, such as logical units identified by logical unit numbers (LUNs). Such volumes or logical devices are referred to herein as logical storage volumes. The logical storage space of the storage system 104-1 may also be merged in connection with the use of a set of logical storage volumes. Thus, logical storage volumes may or may not correspond to physical storage space of respective ones of the storage devices 110. For example, storage device 110-1 may provide two or more different logical storage volumes. As another example, a single logical storage volume may span two or more of the storage devices 110. The host devices 102 are configured, utilizing host adapters 106, to access any desired combination of the logical storage volumes independent of the location of such logical storage volumes on the storage devices 110. Each logical storage volume of the storage system 104-1 may have a size or capacity that may be expressed in terms of device geometry. For example, a given one of the storage devices 110 (e.g., storage device 110-1) or logical storage volumes thereof may have device geometry parameters such as a number of cylinders, a number of heads or tracks per cylinder, the number of blocks per track, etc. It should be noted that terms such as "track," "cylinder," and "head" are used as reference to sequential groups of logical block addresses (LBAs) of a LUN. Some storage systems, for example, utilize block addressable storage and SCSI specifications use LBAs for addressing blocks. The logical block addressing scheme is a different way of addressing versus the physical addressing scheme (e.g., which may use physical tracks, heads, cylinders, etc.). For convenience, LBAs are grouped into chunks that are also referred to as "tracks." A given track, such as "Track 0" therefore represents the first 128 kilobytes (KB) of date for a given LUN, which would be 256 blocks of 512 bytes each. In the description below, it should be understood that the term "track" is used to refer to a sequential group of logical addresses of a logical storage volume (unless by context the term is used to clearly refer to a physical track).

Various internal logical data paths are provided between the host adapters 106, device adapters 108 and the remote adapters 112, which may use various internal buses and communication modules. In some embodiments, the memory 114 may be used to facilitate data transfer between the host adapters 106, device adapters 108 and remote adapters 112. The memory 114, for example, may store information relating to tasks that are to be performed by the host adapters 106, device adapters 108 and remote adapters 112. Such tasks may include, by way of example, generating snapshots (e.g., point-in-time (PIT) snapshots of a logical storage volume) and performing extent-based copy operations (e.g., extent based session or "snap" copy operations utilizing a Snap Utility of TimeFinder for Symmetrix®, available from Dell EMC). As used herein, an "extent" refers to a contiguous area of storage on a logical storage volume. A given extent may comprise one or more "tracks" or other units of allocation of storage space (e.g., of one or more of the storage devices 110). As used herein, the term track refers to a minimum granularity for preserving point-in-time data. The size of a track may be, for example, 128 kilobytes (KB), 64 KB, 32 KB, etc.

Extent copy operations, also referred to as extent-based session operations, may be accepted or acknowledged from the storage system 104-1 to a requesting one of the host devices 102 before such extent-based sessions operations are actually completed (e.g., before an extent copy from one extent to another on a same or different logical storage volume has been completed on the storage devices 110). In some cases, a PIT snapshot is requested by one or more of the host devices 102 while one or more extent copy operations are in progress (e.g., acknowledged or accepted to the requesting host device 102 but before such operations are completed within the storage system 104-1).

Illustrative embodiments provide techniques for enabling snapshot operations for a logical storage volume while extent copy operations for that logical storage volume are in progress, along with enabling extent copy operations on existing snapshot source or linked target logical storage volumes. In some embodiments, there are no restrictions in performing such extent copy operations (e.g., extent-based snap copy or other extent-based session operations) or in taking snapshots (e.g., full PIT copies) on a same logical storage volume, and both types of operations work seamlessly. Various scenarios regarding different possibilities for snapshot and extent-based session operations will be described in further detail below with respect to FIG. 3.

The storage system 104-1 includes a device sequence number tracking module 116, a track sequence number tracking module 118 and an I/O processing module 120. The modules 116, 118 and 120 may be implemented at least partially internal to one or more of the host adapters 106, device adapters 108, storage devices 110 and remote adapters 112 of the storage system 104-1.

The device sequence number tracking module 116 is configured to maintain, for each of two or more logical storage volumes of the storage system 104-1, a set of device sequence numbers for snapshot operations associated with that logical storage volume and extent copy operations associated with one or more extents of that logical storage volume, each extent comprising one or more tracks. The track sequence number tracking module 118 is configured to maintain, for each track of the two or more logical storage volumes, a track sequence number representing the state of a given track with respect to the snapshot operations and extent copy operations associated with a given one of the two or more logical storage volumes containing the given track.

The I/O processing module 120 is configured to receive one or more I/O operations directed to at least one of the two or more logical storage volumes from one or more of the host devices 102 coupled to the storage system 104-1 while at least one snapshot operation or extent copy operation for the two or more logical storage volumes is in progress. The I/O processing module 120 is also configured to utilize the track sequence numbers and the sets of device sequence numbers maintained by the modules 116 and 118 to determine processing of the received I/O operations while said at least one snapshot operation or extent copy operation is in progress.

It is to be appreciated that the particular arrangement of the host devices 102, storage systems 104 and components thereof such as the device sequence number tracking module 116, the track sequence number tracking module 118 and the I/O processing module 120 illustrated in the FIG. 1 embodiments is presented by way of example only, and that alternative arrangements can be used in other embodiments. As discussed above, for example, one or more of the device sequence number tracking module 116, track sequence number tracking module 118 and I/O processing module 120 may in some embodiments be implemented internal to one or more of the host adapters 106, device adapters 108, storage devices 110 or remote adapters 112. As another example, the functionality associated with the device sequence number tracking module 116, track sequence number tracking module 118 and I/O processing module 120 may be combined into one module, or separated across more than three modules with the multiple modules possibly being implemented with multiple distinct processors or processing devices.

At least portions of the device sequence number tracking module 116, track sequence number tracking module 118 and I/O processing module 120 may be implemented at least in part in the form of software that is stored in memory and executed by a processor.

It is to be understood that the particular set of elements shown in FIG. 1 for processing I/O operations for logical storage volumes while snapshot and extent copy operations are in progress on the logical storage volumes is presented by way of illustrative example only, and in other embodiments additional or alternative elements may be used. Thus, another embodiment may include additional or alternative systems, devices and other network entities, as well as different arrangements of modules and other components.

The host devices 102 and storage systems 104, as will be described in further detail below, may be part of cloud infrastructure such as Virtustream Enterprise Cloud, Virtustream Storage Cloud, GCP, AWS and Microsoft Azure.

The host devices 102 and storage systems 104 and other components of the information processing system 100 in the FIG. 1 embodiment are assumed to be implemented using at least one processing platform each comprising one or more processing devices each having a processor coupled to a memory. Such processing devices can illustratively include particular arrangements of compute, storage and network resources.

The host devices 102 and storage systems 104, or components thereof, may be implemented on respective distinct processing platforms, although numerous other arrangements are possible. For example, in some embodiments at least portions of one or more of the host devices 102 and the storage system 104-1 are implemented on the same processing platform.

The term "processing platform" as used herein is intended to be broadly construed so as to encompass, by way of illustration and without limitation, multiple sets of processing devices and associated storage systems that are configured to communicate over one or more networks. For example, distributed implementations of the system 100 are possible, in which certain components of the system reside in one data center in a first geographic location while other components of the system reside in one or more other data centers in one or more other geographic locations that are potentially remote from the first geographic location. Thus, it is possible in some implementations of the system 100 for the host devices 102, storage systems 104, or portions or components thereof, to reside in different data centers. Numerous other distributed implementations are possible.

Additional examples of processing platforms utilized to implement the system 100 in illustrative embodiments will be described in more detail below in conjunction with FIGS. 12 and 13.

It is to be appreciated that these and other features of illustrative embodiments are presented by way of example only, and should not be construed as limiting in any way.

An exemplary process for processing I/O operations for logical storage volumes while snapshot and extent copy operations are in progress on the logical storage volumes will now be described in more detail with reference to the flow diagram of FIG. 2. It is to be understood that this particular process is only an example, and that additional or alternative processes for processing I/O operations for logical storage volumes while snapshot and extent copy operations are in progress on the logical storage volumes can be carried out in other embodiments.

In this embodiment, the process includes steps 200 through 206. These steps are assumed to be performed by the device sequence number tracking module 116, track sequence number tracking module 118 and I/O processing module 120. The process begins with step 200, maintaining, for each of two or more logical storage volumes of a storage system, a set of device sequence numbers for snapshot operations associated with that logical storage volume and extent copy operations associated with one or more extents of that logical storage volume, each extent comprising one or more tracks. The set of device sequence numbers for a given one of the logical storage volumes may comprise: a source sequence number that is incremented when a snapshot of the given logical storage volume is taken; a target sequence that is incremented when the given logical storage volume is linked to a snapshot of another one of the two or more logical storage volumes; a source extent sequence number that is incremented when an extent copy operation with a source extent on the given logical storage volume is initiated; and a target extent sequence number that is incremented when an extent copy operation with a target extent on the given logical storage volume is initiated. Incrementing a given one of the set of device sequence numbers may comprise setting a value of the given device sequence number to a value larger than a current largest value among the set of device sequence numbers for the given logical storage volume.

In step 202, a track sequence number representing the state of a given track with respect to the snapshot operations and extent copy operations associated with a corresponding one of the two or more logical storage volumes containing the given track is maintained for each track of the two or more logical storage volumes. Maintaining the track sequence numbers may comprise maintaining a track identifier table for a given one of the logical storage volumes, the track identifier table comprising an entry for each track of the given logical storage volume, a given entry for a given one of the tracks of the given logical storage volume comprising: the track sequence number for the given track; a device sequence number of track data for the given track held in a cache of the storage system; and a protection bit indicating whether the given track is covered by one or more in-progress extent copy operations.

Figure 2:
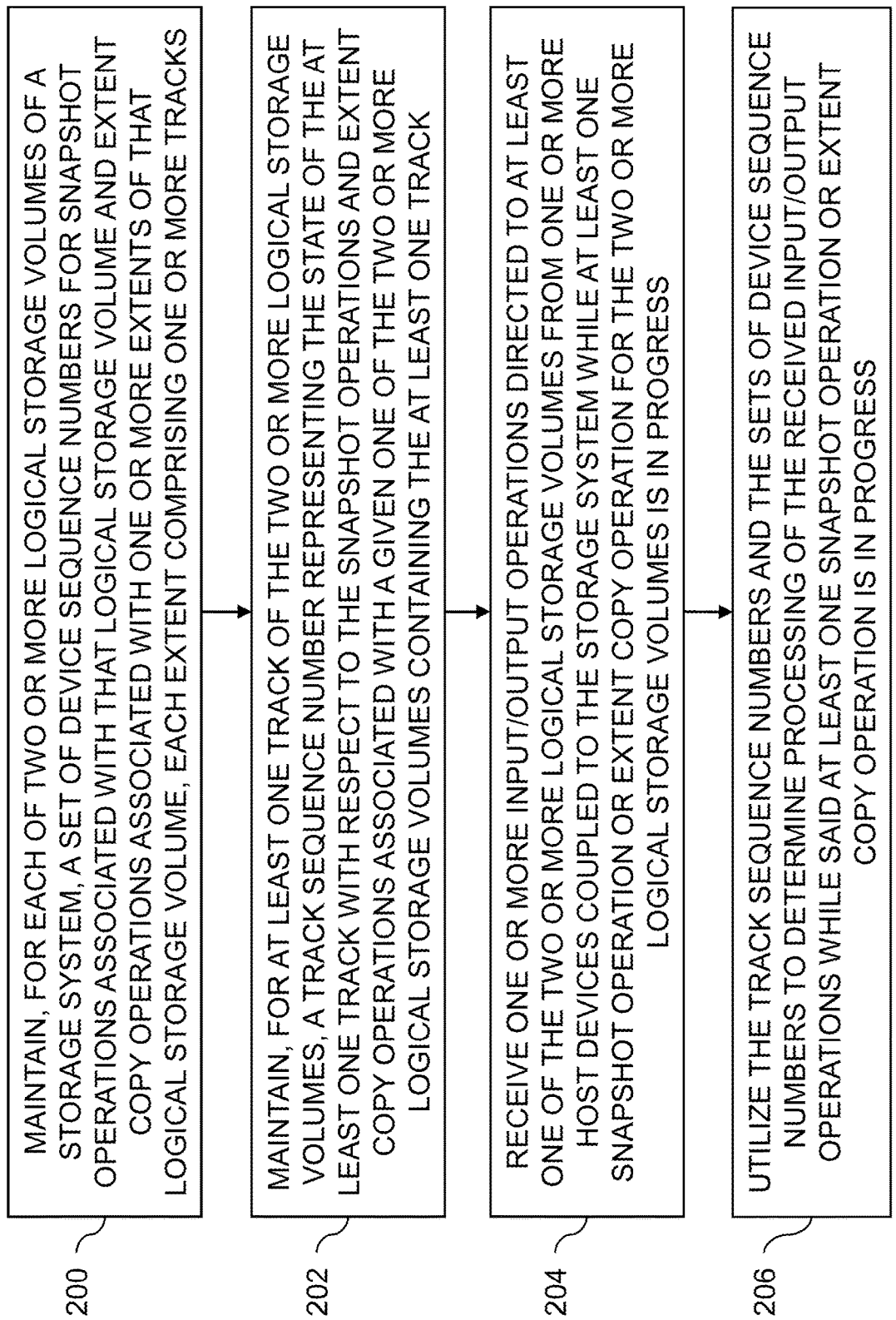
FIG. 2 is a flow diagram of an exemplary process for processing input/output operations for logical storage volumes while snapshot and extent copy operations are in progress on the logical storage volumes in an illustrative embodiment.

The FIG. 2 process, in some embodiments, further comprises maintaining a replication data pointer table comprising one or more replication data pointer entries, a given replication data pointer entry associated with a given track of a given one of the two or more logical storage volumes comprising: a source track sequence number at a time of a write to the given track; a number of snapshots sharing the source track sequence number; and a location of point-in-time data for the given track at the time of the write to the given track in one or more physical storage devices of the storage system. The FIG. 2 process may also include maintaining a target link table comprising one or more target link entries, a given target link entry associated with a given snapshot of a source one of the two or more logical storage volumes comprising: a source sequence number of the source logical storage volume at a time of linking the given snapshot of the source logical storage volume to a target one of the two or more logical storage volumes; and a target sequence number of the target logical storage volume at the time of linking the given snapshot of the source logical storage volume to the target logical storage volume. The FIG. 2 process may further include maintaining extent source and target nodes for extent copy operations, a given one of the extent source and target nodes for a given extent copy operation associated with a given extent comprising: a size of the given extent; start and end tracks of the given extent on a source one of the two or more logical storage volumes and a target one of the two or more logical storage volumes; a source extent sequence number for the source logical storage volume; and a target extent sequence number for the target logical storage volume.

In step 204, one or more I/O operations directed to at least one of the two or more logical storage volumes are received from one or more host devices coupled to the storage system while at least one snapshot operation or extent copy operation for the two or more logical storage volumes is in progress. The track sequence numbers and the sets of device sequence numbers are utilized in step 206 to determine processing of the received input/output operations while said at least one snapshot operation or extent copy operation is in progress.

A given one of the I/O operations received in step 204 may be a read operation directed to a given track of a given one of the two or more logical storage volumes. In such cases, step 206 may include determining if the given track is in a cache accessible by a host adapter of the storage system that received the read operation and utilizing the cache to service the read operation responsive to certain designated conditions. One such designated condition may be determining that the given track is in the cache and the track sequence number of the given track is greater than or equal to both the target sequence number of the given logical storage volume and the target extent sequence number of the given logical storage volume. Another such designated condition may be determining that a read miss tag is set for the given track, reading a cache header sequence number for the given track, and determining that the cache header sequence number for the given track is greater than or equal to both the target sequence number of the given logical storage volume and the target extent sequence number of the given logical storage volume.

Step 206 for the read operation may also comprise determining that at least one of: the given track is not in a cache accessible by a host adapter of the storage system that received the read operation; and a version of the given track in the cache is not a valid source track. In such cases, step 206 may include locating a valid source track for the given track utilizing a back-end adapter coupled to one or more storage devices of the storage system.

Locating the valid source track may comprise using a target track when: the track sequence number is greater than or equal to the target sequence number; and the track sequence number is greater than or equal to the target extent sequence number or no protection bit is set.

Locating the valid source track may comprise using a target link table when: the track sequence number is less than the target sequence number; and the track sequence number is greater than or equal to the target extent sequence number or no protection bit is set.

Locating the valid source track may comprise using a target extent node with a highest sequence number among target extent nodes for the given track when: the track sequence number is greater than or equal to the target sequence number; the track sequence number is less than the target extent sequence number; and the protection bit is set.

Locating the valid source track may comprise using the target extent node with the highest sequence number among the target extent nodes for the given track when: the track sequence number is less than the target sequence number; the track sequence number is less than the target extent sequence number; the protection bit is set; and the target extent node with the highest sequence number among the target extent nodes for the given track is greater than a target link entry with the highest sequence number among target link entries of a target link table for the given track.

Locating the valid source track may comprise using the target link entry with the highest sequence number among the target link entries of the target link table for the given track when: the track sequence number is less than the target sequence number; the track sequence number is less than the target extent sequence number; the protection bit is set; and the target extent node with the highest sequence number among the target extent nodes for the given track is less than the target link entry with the highest sequence number among the target link entries of the target link table for the given track.

A given one of the I/O operations received in step 204 may alternatively comprise a write operation directed to a given track of a given one of the two or more logical storage volumes that has one or more snapshot and extent copy operations in progress. In such cases, step 206 may include setting a first variable to a lowest source sequence number yet to be processed for the given logical storage volume responsive to determining that the track sequence number of the given track is less than a current value the source sequence number of the given logical storage volume, setting a second variable to a lowest target sequence number yet to be processed for the given logical storage volume responsive to determining that the track sequence number of the given track is less than a current value of the target sequence number of the given logical storage volume, setting a third variable to a lowest source extent sequence number yet to be processed for the given logical storage volume responsive to determining that the track sequence number of the given track is less than a current value of the source extent sequence number of the given logical storage volume, setting a fourth variable to a lowest target extent sequence number yet to be processed for the given logical storage volume responsive to determining that the track sequence number of the given track is less than a current value of the target extent sequence number of the given logical storage volume, and running a loop starting from the current track sequence number to a largest one of the set of device sequence numbers of the given logical storage volume to preserve track data of the given track prior to applying the write operation for the given track to the given logical storage volume.

Running the loop may comprise setting a fifth variable to a lowest current value among the first, second, third and fourth variables, processing a next source sequence number responsive to determining that the track sequence number of the given track is less than the source sequence number and the fifth variable is equal to the first variable, processing a next target sequence number responsive to determining that the track sequence number of the given track is less than the target sequence number and the fifth variable is equal to the second variable, processing a next source extent sequence number responsive to determining that the track sequence number of the given track is less than the source extent sequence number and the fifth variable is equal to the third variable, and processing a next target extent sequence number responsive to determining that the track sequence number of the given track is less than the target extent sequence number and the fifth variable is equal to the fourth variable.

Processing the next source sequence number may comprise grouping together snapshot sequences until a valid target snapshot sequence is found, setting a snapshot share count variable to a current snapshot sequence number plus a last snapshot sequence number in the group of snapshot sequences, pushing current track data to a replication data pointer node, updating the replication data pointer node with the snapshot share count and the track sequence number, setting the fifth variable to a current source sequence number corresponding to the valid target snapshot sequence, and updating the first variable to a next source sequence number or, if there are no remaining active source sequences pending, to a highest one of the set of device sequence numbers.

Processing the next target sequence number may comprise locating a source track from a target link entry or a chain of source to target listing, copying the current track data to a target track, updating a value of the track sequence number to match a current target sequence number, setting the fifth variable to the current target sequence number, and updating the second variable to a next target sequence number or, if there are no remaining active target sequences pending, to a highest one of the set of device sequence numbers.

Processing the next source extent sequence number may comprise preparing a list of extent target tracks that need current track data for the given track, copying the current source track data to the extent target tracks in the list and updating protection bits for the extent target tracks in the list, setting the fifth variable to a current extent source sequence number, and updating the third variable to a next source extent sequence number or, if there are no remaining active source extent sequences pending, to a highest one of the set of device sequence numbers.

Processing the next target extent sequence number may comprise locating a source track from an extent target node or a chain of source to target listing, copying the current source track data to a target extent track, setting the fifth variable to a current extent target sequence number, and updating the fourth variable to a next target extent sequence number or, if there are no remaining active target extent sequences pending, to a highest one of the set of device sequence numbers.

Figure 3:
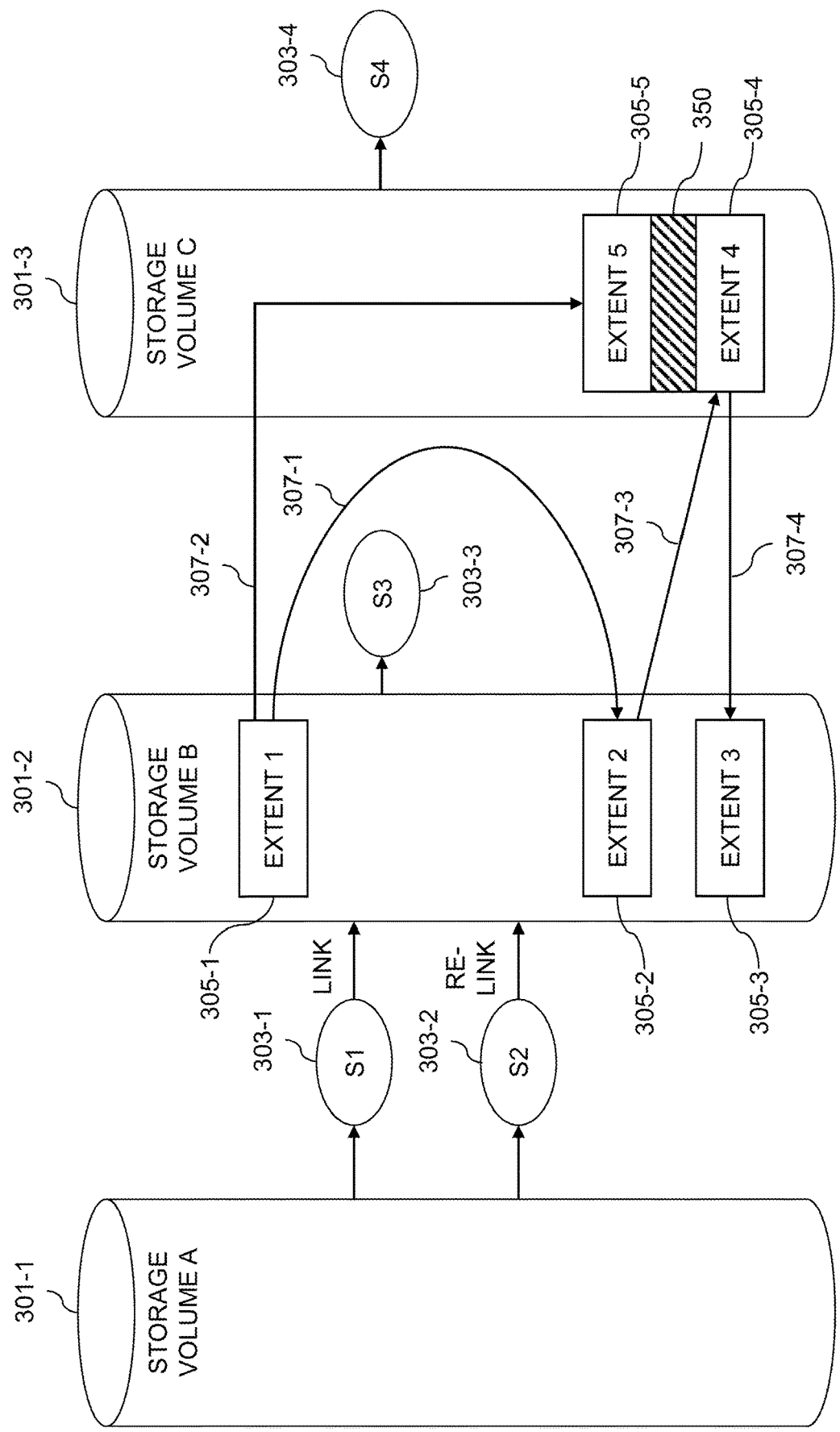
FIG. 3 is a block diagram illustrating examples of snapshot and extent copy operations on logical storage volumes in an illustrative embodiment.

FIG. 3 shows a set of three logical storage volumes 301-1, 301-2 and 301-3 (collectively, logical storage volumes 301), also referred to herein as volume A, volume B and volume C, respectively. A set of PIT snapshots 303-1, 303-2, 303-3 and 303-4 (collectively, snapshots 303), also referred to herein as S1, S2 S3 and S4, respectively, are generated for different ones of the logical storage volumes 301. For example, snapshot S1 is a snapshot of volume A that is linked to volume B, snapshot S2 is another snapshot of volume A that is re-linked to volume B (e.g., the linked target volume B is incrementally updated or "re-linked" to a new snapshot of volume A, where the re-link of snapshot S2 performs an incremental or differential update of the previous snapshot S1). Snapshot S3 is a snapshot of volume B, and snapshot S4 is a snapshot of volume C.

A number of extent-based copy operations are also illustrated in FIG. 3 for extents 305-1, 305-2, 305-3, 305-4 and 305-5 (collectively, extents 305), also referred to herein as extent 1, extent 2, extent 3, extent 4 and extent 5, respectively. In the FIG. 3 example, it is further assumed that extent 4 and extent 5 at least partially overlap one another, as indicated by region 350. The extent-based copy operations in FIG. 3 include extent-based copy operations 307-1, 307-2, 307-3 and 307-4 (collectively, extent-based copy operations 307). Extent-based copy operation 307-1 copies extent 1 to extent 2, extent-based copy operation 307-2 copies extent 1 to extent 5, extent-based copy operation 307-3 copies extent 2 to extent 4, and extent-based copy operation 307-4 copies extent 4 to extent 3.

As noted above, illustrative embodiments enable PIT snapshot operations of the logical storage volumes 301 to be taken while extent-based session operations (e.g., extent-based copy operations 307) are in progress on the logical storage volumes 301. This encompasses a number of scenarios, such as allowing a PIT snapshot of a logical storage volume to be taken while extent copy operations involving that logical storage volume are in progress, in allowing extent copy operations to be performed on existing snapshot source and target logical storage volumes, etc. Various such scenarios will now be described with respect to FIG. 3.

In a first scenario, a snapshot is taken while an extent copy operation is in progress. This is illustrated in FIG. 3 as the full PIT snapshot S4 of volume C may be created while extent-based copy operations (e.g., target extent copies 307-2 and 307-3, and source extent copy 307-4) are in progress on volume C.

In a second scenario, extent copy operations are run on a full PIT snapshot source logical storage volume. This is illustrated in FIG. 3 as extent-based copy operations (e.g., source extent copies 307-1, 307-2, 307-3, and target extent copy 307-4) are started followed by a PIT volume snapshot S3 of volume B.

In a third scenario, extent copy operations are run on a logical storage volumes that is a target link for a snapshot of another logical storage volume. This is illustrated in FIG. 3, as volume B is a target link of PIT snapshots S1 and S2 of volume A, while extent-based copy operations 307 are in progress.

In a fourth scenario, a number of overlapping copies on extent tracks are run at the same time. This is illustrated in FIG. 3 as in volume C, extent 4 is a target first (e.g., for extent copy operation 307-3 of extent 2 to extent 4) and then a source second (e.g., for extent copy operation 307-4 of extent 4 to extent 3). In some embodiments, 16 overlapping copies on extent tracks may be run at the same time.

In a fifth scenario, a re-link operation is run while extent copy operations are in progress on a target logical storage volume. This is illustrated in FIG. 3, as snapshot S3 is re-linked to target volume B while extent copy operations 307 are in progress. As noted above, "re-link" is a command that provides the capability for performing incremental updates or refreshes of linked targets (e.g., in FIG. 3, volume B is a target linked to source volume A).

In a sixth scenario, overlapping of target extents is enabled. This is illustrated in FIG. 3 as extents 4 and 5 overlap one another as illustrated by region 350. For this scenario, the order of operations is important, as the latest target extent overwrites previous ones.

In some embodiments, a snapshot table is used to hold information about the existing snapshots on a particular logical storage volume. A snapshot table may be initialized for each logical storage volume, and resides in its own page-able metadata object. This page-able metadata object may be kept in a global memory of the storage system, such as memory 114 of storage system 104-1. The snapshot table utilizes four types of dependent device sequence numbers denoted DevS, DevT, DevES and DevET. Each logical storage volume has a DevS, DevT, DevES and DevET number associated therewith.

DevS represents the latest device "source" sequence number in a device ready state buffer. The device ready state buffer may be maintained in the global memory of an associated storage system, such as in memory 114 of storage system 104-1. DevT represents the latest device "target" sequence number in the device ready state buffer. A particular logical storage volume may be both a "source" and a "target" for different operations. In the FIG. 3 example, volume B is a "source" for the snapshot S2 and is a "target" for the linked snapshot S1 from "source" volume A. DevS is bumped up or incremented upon every activation of a snapshot of logical storage volume, and each snapshot is associated with the incremented source sequence number (DevS) to identify the data needed by that snapshot. DevT is bumped up or incremented when a logical storage volume is linked or re-linked to a snapshot.

DevES represents the extent "source" sequence number in the device ready state buffer, and DevET represents the extent "target" sequence number in the device ready state buffer. DevES is bumped up or incremented when an extent source session is created, and DevET is bumped up or incremented when an extent target session is created. Similar to a logical storage volume, an extent can be both a "source" and a "target." In FIG. 3, for example, extent 4 is a target of the extent copy 307-3 and is the source of extent copy 307-4.

During session creation (e.g., taking of a snapshot, linking or relinking of a snapshot, an extent copy, etc.), the respective sequence number (e.g., the corresponding one of DevS, DevT, DevES and DevET) is incremented to one larger than the current largest sequence number among DevS, DevT, DevES and DevET.

Figure 4:
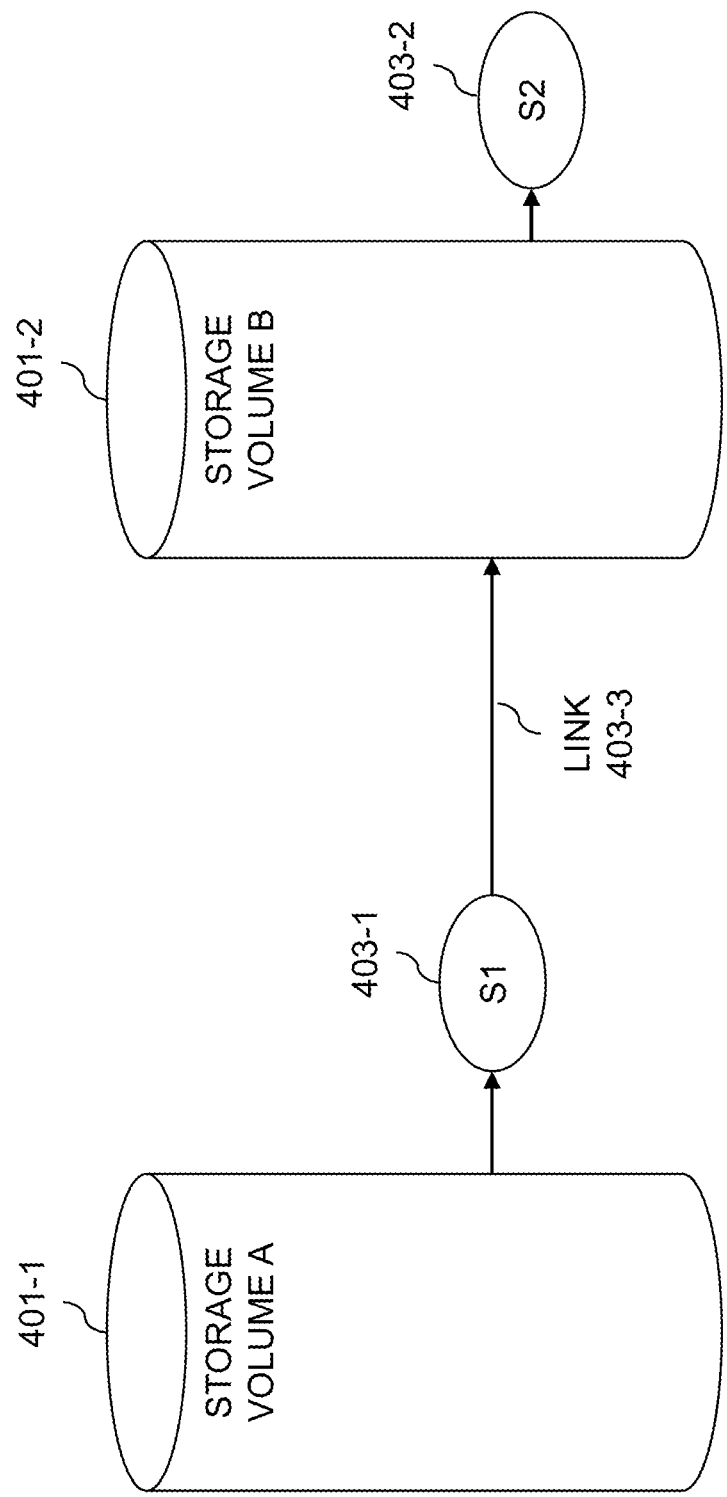
FIG. 4 is a block diagram illustrating a sequence of snapshot operations on logical storage volumes in an illustrative embodiment.

An example of such incrementing will now be described with respect to FIG. 4, which shows logical storage volumes 401-1 and 401-2 (collectively, logical storage volumes 401), also referred to as volume A and volume B. Assume, to begin, that volume A and volume B start with all of DevS, DevT, DevES and DevET at 0. A snapshot S1 of volume A is taken 403-1, at which point the source sequence number DevS for volume A is incremented to 1. Next, a snapshot S2 of volume B is taken 403-2, at which point the source sequence number DevS for volume B is incremented to 1. Next, the snapshot S1 of volume A is linked 403-3 to volume B, at which point the target sequence number DevT for volume B is incremented from 0 to 2 (e.g., one higher than the current largest sequence number for volume B, which is DevS=1).

Track sequence numbers are used to represent the state of a track, and are denoted Trk. A track sequence number (Trk) is maintained for each track on each logical storage volume. The track sequence numbers (Trk) are utilized in conjunction with the device sequence numbers (DevS, DevT, DevES and DevET) to make decisions during I/O operations, as will be described in further detail below with respect to FIGS. 6 and 7.

Track sequence numbers are used to identify when tracks are updated with respect to a particular session (e.g., a PIT snapshot of a logical storage volume, an extent copy, etc.). A track sequence number may also be used to find all snapshots that are affected by a write to the track to indicate whether a target track is valid or not.

Track sequence numbers are initialized to zero during device creation and expansion, and reside in a track identifier table that may be maintained in a global memory of a storage system, such as the memory 114 of storage system 104-1.

Replication data pointers (RDPs) may be used to keep track of PIT data when there are writes to a source logical volume after a snapshot is taken. For example, an RDP table may be maintained in a global memory of a storage system such as memory 114 of storage system 104-1, where the RDP table includes entries or nodes. Each entry or node in the RDP table indicates a source track sequence number at the time of write (e.g., when the write is acknowledged to a requesting one of the host devices 102), a corresponding snapshot sequence number, and the location of the PIT data (e.g., on back-end storage such as storage devices 110 of storage system 104-1). RDP entries or nodes in the RDP table may be ordered by source track sequence number for faster traversal.

A target link table may be used to link a snapshot on an existing target logical storage volume. The target link table may be stored in a global memory of a storage system, such as memory 114 of storage system 104-1, as part of a page-able metadata object. The target link table stores: (i) a source sequence number (DevS) corresponding to a snapshot of a source logical storage volume; and (ii) a target sequence number (DevT) of a target logical storage volume at the time of linking, re-linking or restoring the snapshot. The incremented target sequence number is associated with the target link information in the target link table.

Extent source and target nodes are created during extent-based copy operations (e.g., extent-based snap establish operations). The extent source and target nodes store extent size, start and end tracks of both the source and target logical storage volumes, and source and target device extent sequence numbers. During extent establish, a protection bit is set on every interested track on both the source and target logical storage volumes. Extent nodes are used to keep all tracks of an extent track-based copy operation on a device, and they may be sorted in a binary tree for faster look-up. Protection bits indicate whether data is copied to a target extent track or not. Extent sessions are automatically terminated once the extent copy is finished. Extent nodes are usually short-lived, and memory is freed up once the session is terminated.

Figure 5:
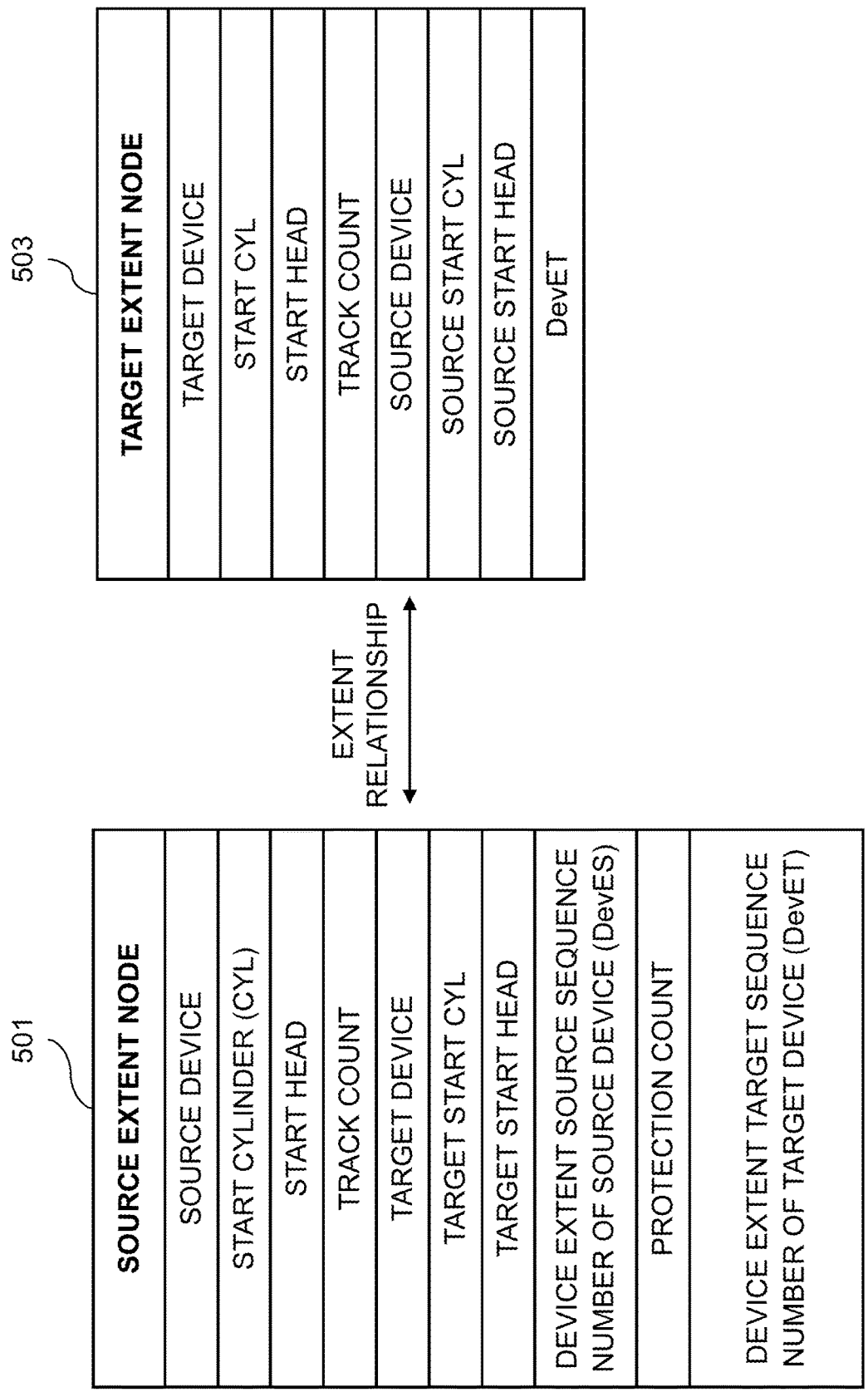
FIG. 5 illustrates an example structure for extent nodes in an illustrative embodiment.

FIG. 5 shows an example of a source extent node 501 and a target extent node 503. Source extent node 501 and target extent node 503 are created during establishment of an extent session (e.g., an extent copy such as an extent-based snap copy). The source extent node 501 and target extent node 503 store extent size, start and end tracks of both the source and target logical storage volumes, and the source and target device extent sequence numbers (DevES and DevET, respectively). The extent nodes 501 and 503 are used to keep all tracks associated with an extent session on a device, and they are sorted in a binary tree in some embodiments for faster look-up. During extent establish, the protection bit is set on every interested track, on both the source logical storage volume and the target logical storage volume. The protection bits indicate whether data has been copied to the target extent track or not. Reads to the extent target track should not service the in-cache data if the track sequence number (Trk) is smaller than the device extent sequence number (DevES or DevET) and the protection bit is set.

Figure 6A:
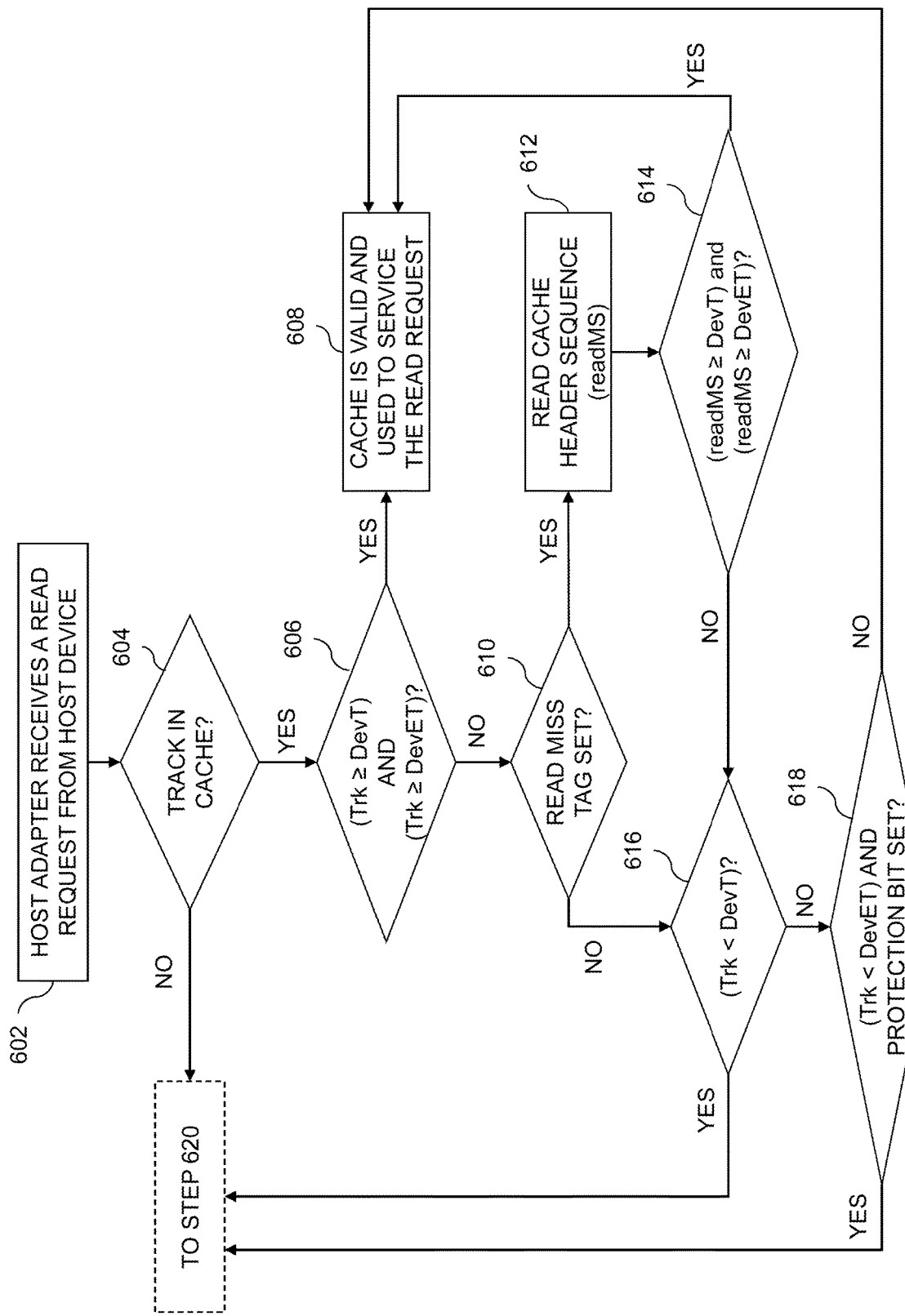
FIGS. 6A-6C depict a processing flow for performing a read operation in a storage system while snapshot and extent copy operations are in progress in an illustrative embodiment.
Figure 6B:
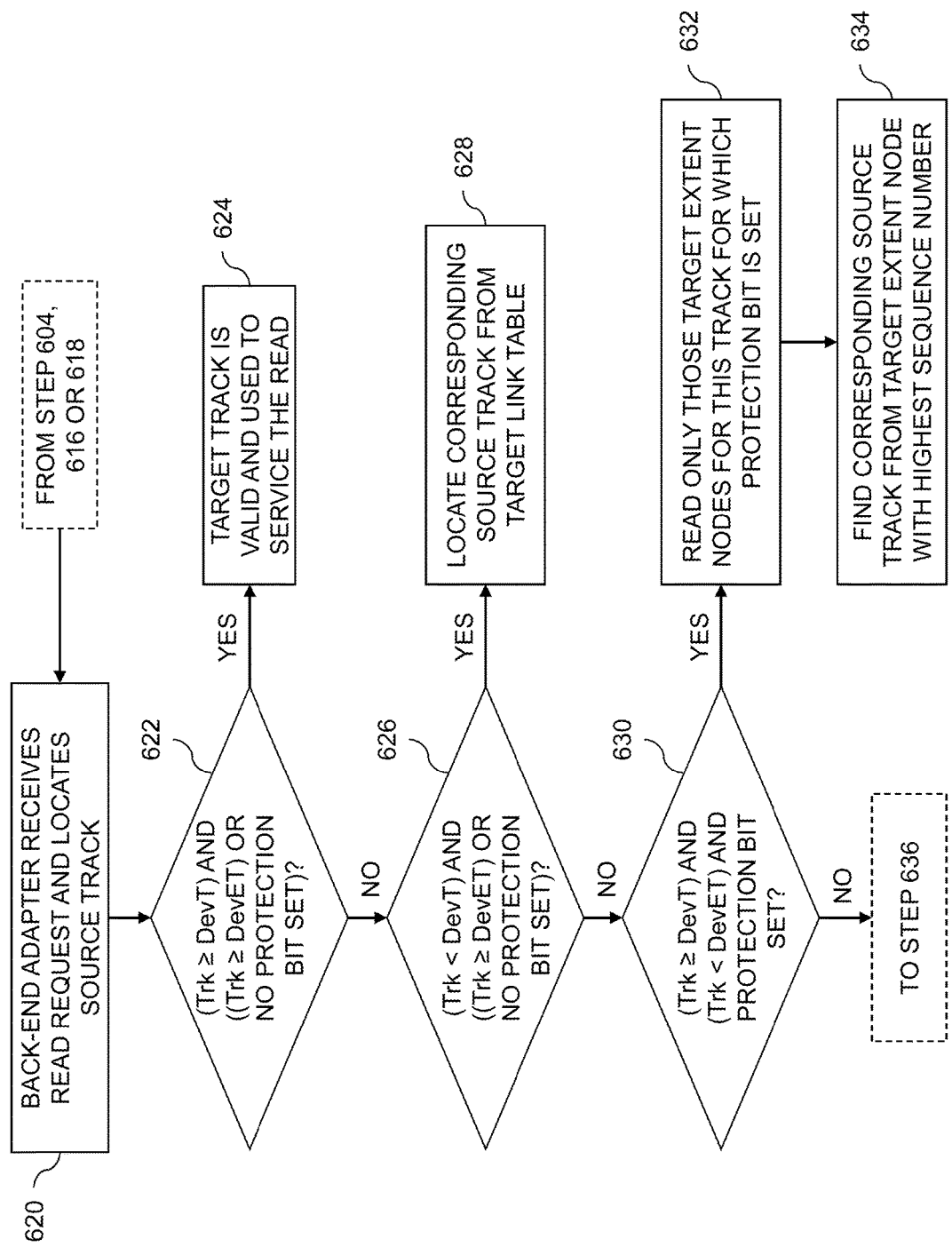
Figure 6C:
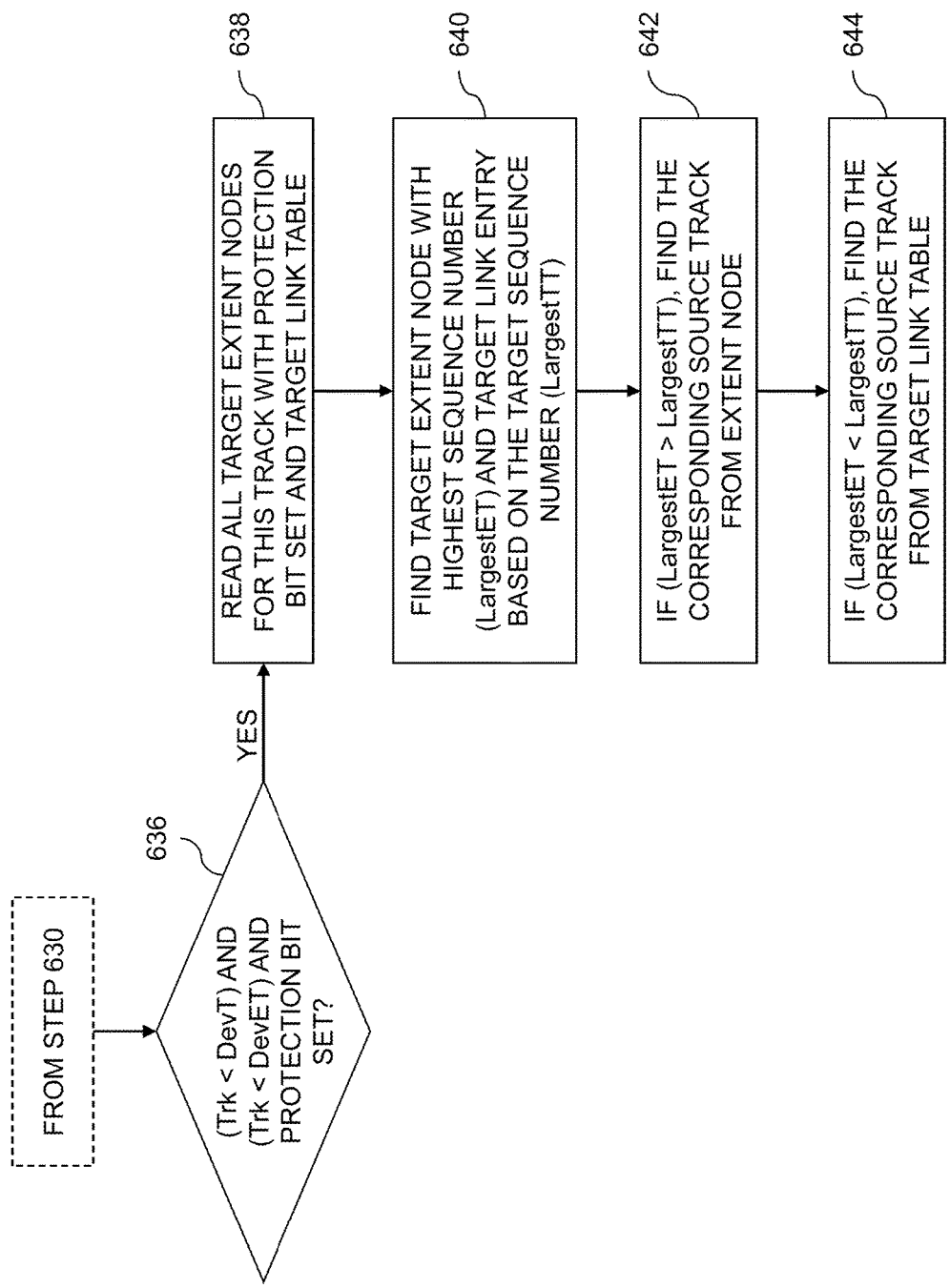
Figure 7A:
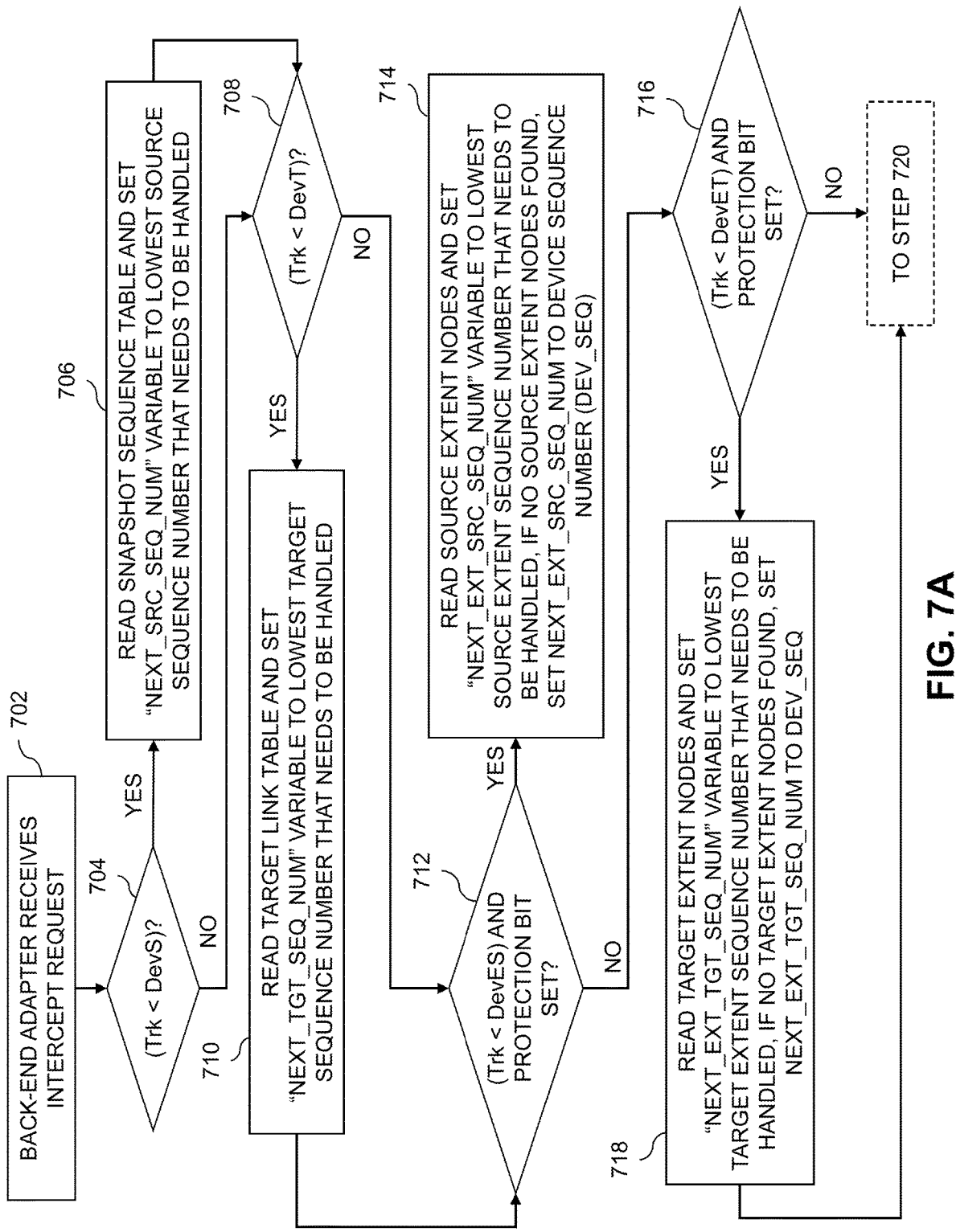
FIGS. 7A-7D depict a processing flow for performing a write operation in a storage system while snapshot and extent copy operations are in progress in an illustrative embodiment.
Figure 7B:
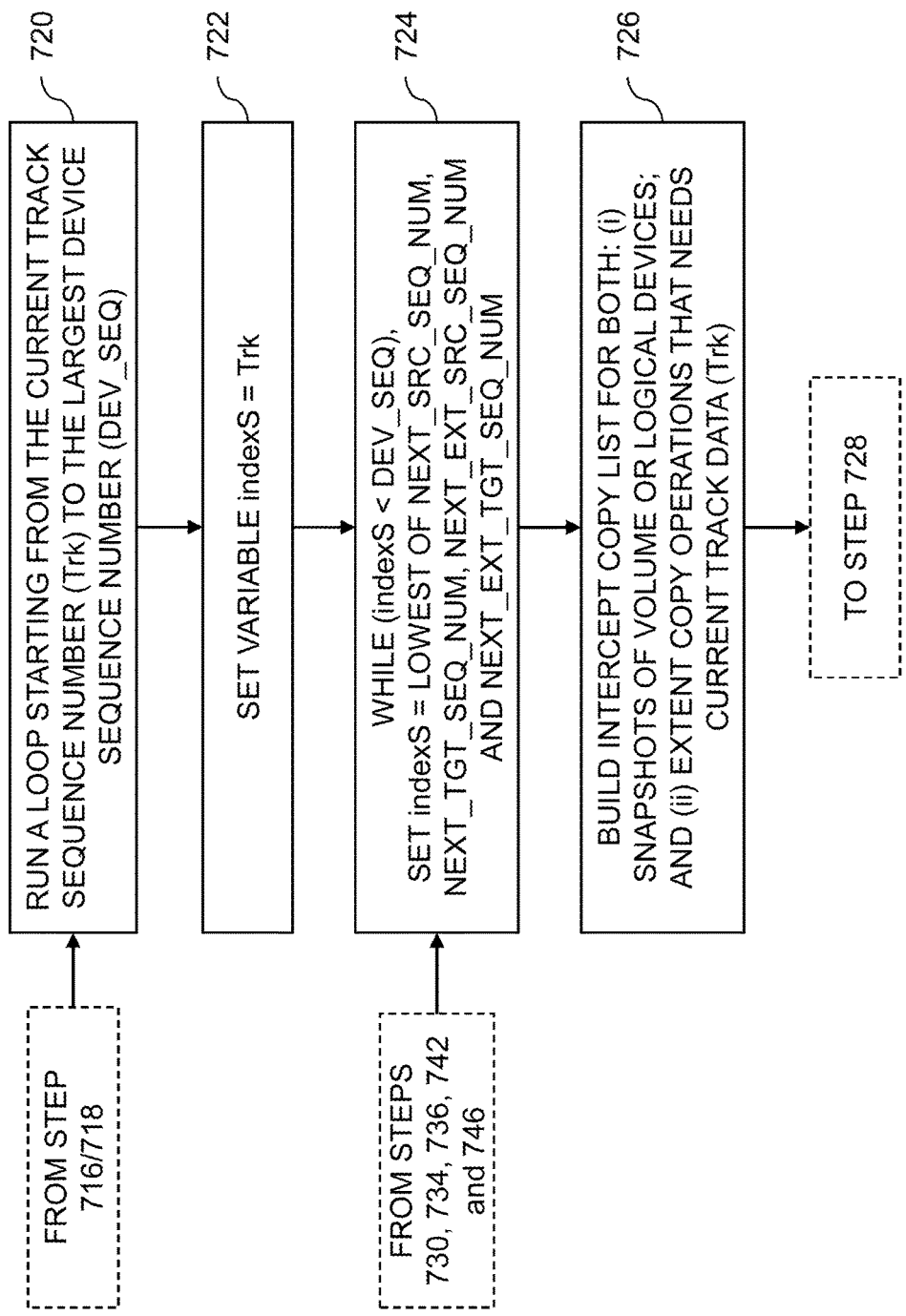
Figure 7C:
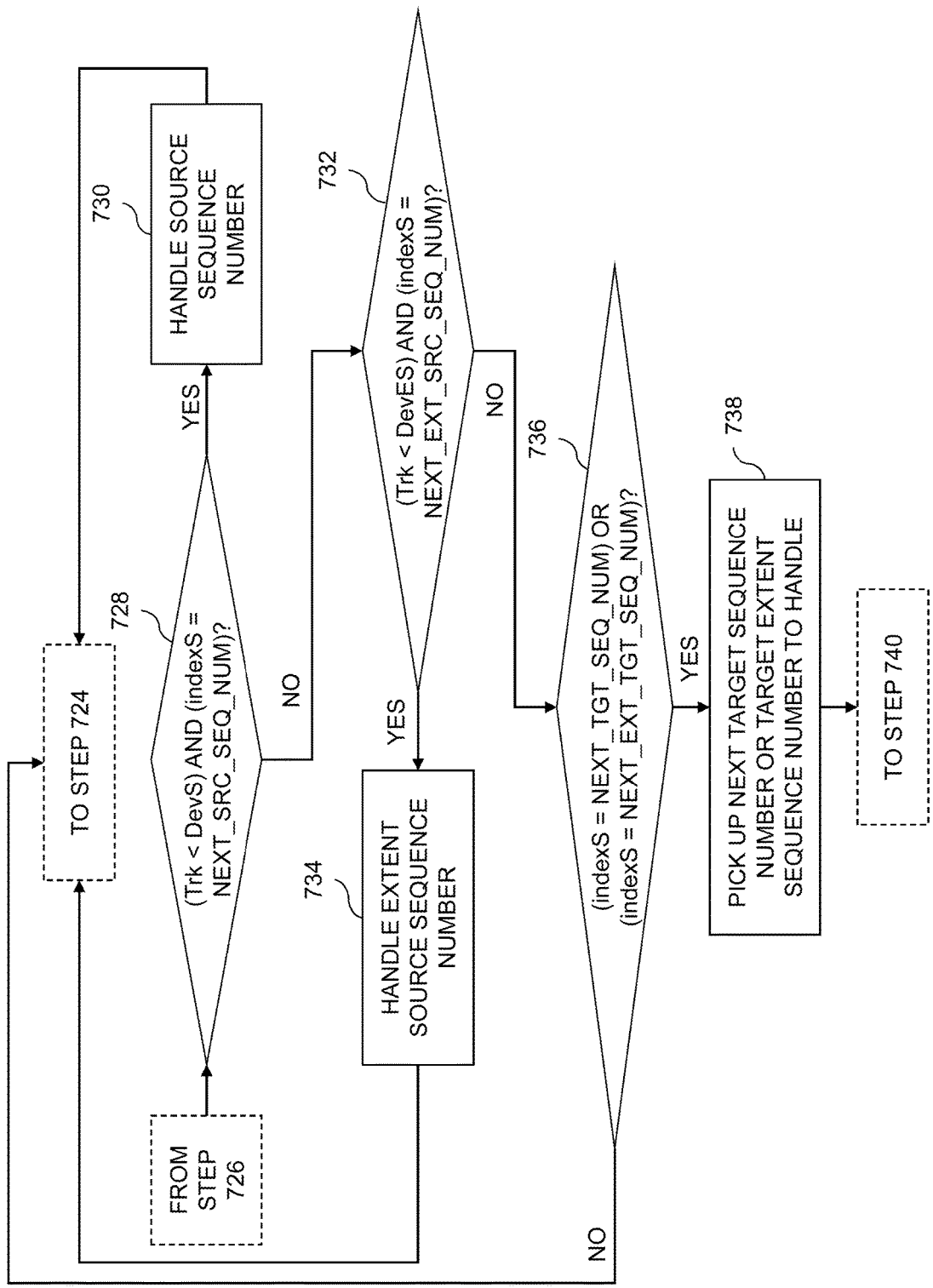
Figure 7D:
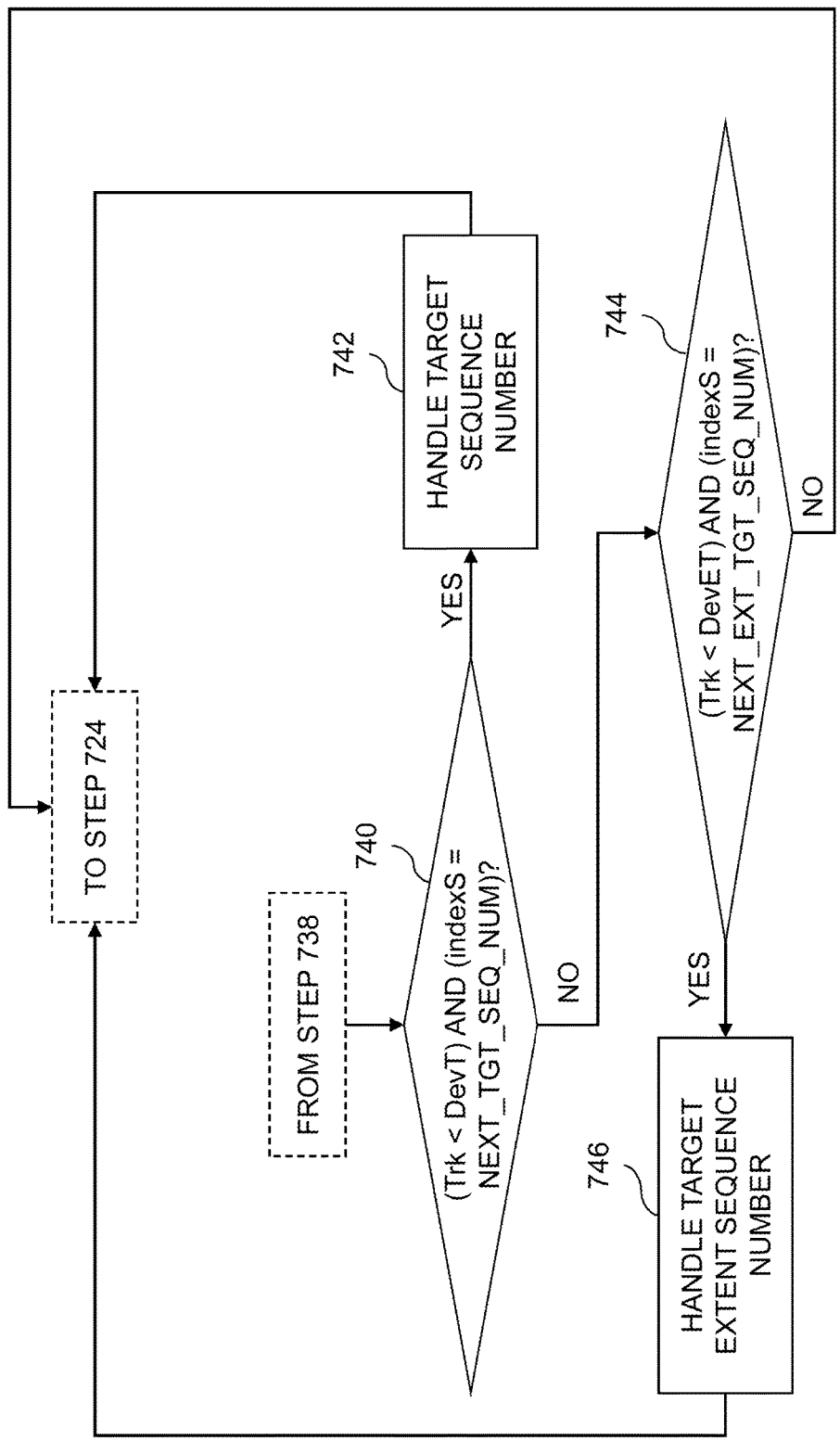

I/O flow using the device sequence numbers and track sequence numbers will now be described in further detail with respect to FIGS. 6 and 7. FIGS. 6A-6C, collectively referred to as FIG. 6, show read I/O flow handling. More particularly, FIG. 6A shows read I/O flow handling on a host adapter (e.g., one of host adapters 106 of storage system 104-1) while FIGS. 6B and 6C show read I/O flow handling on a back-end or device adapter (e.g., one of device adapters 108 of storage system 104-1).

In step 602, a read request is received at a host adapter (e.g., one of host adapters 106 of storage system 104-1) from a host device (e.g., one of host devices 102). The read request is assumed to be associated with at least one track. For clarity of illustration, it is assumed below that the read request received in step 602 is directed to a single track. In step 604, a determination is made as to whether the track in the read request is in a cache accessible by the host adapter (e.g., in a global memory of a storage system such as memory 114 of storage system 104-1). If the track is not in the cache, the read request is sent to a back-end adapter and the flow continues with step 620 described in further detail below.

If the track is in the cache, the flow continues to step 606, where is it determined whether a track sequence number of the track is greater than or equal to the target sequence number (DevT) and the target extent sequence number (DevET), e.g., whether (Trk>DevT) AND (Trk≥DevET), where "AND" denotes a logical and operation. If so, the cache is valid and used to service the read in request in step 608. If not, the flow continues to step 610 where it is determined whether a read miss tag is set. If the read miss tag is set, the read cache header sequence (readMS) is read in step 612. In step 614, it is determined whether readMS is greater than or equal to DevT and DevET, e.g., whether (readMS≥DevT) AND (readMS≥DevET). If so, the flow continues with step 608 where the cache is valid and used to service the read request.

If the read miss tag is not set, or if readMS is less than DevT or DevET, the flow continues to step 616, where a determination is made as to whether Trk is less than DevT, e.g., whether (Trk<DevT). If so, the read request is sent to the back-end adapter and the flow continues with step 620 described in further detail below. In step 618, a determination is made as to whether Trk is less than DevET and a protection bit is set, e.g., whether (Trk<DevET) AND the protection bit is set. If so, the read request is sent to the back-end adapter and the flow continues with step 620 described in further detail below. If not, the flow continues to step 608 where the cache is valid and used to service the read request.

In step 620, the back-end adapter receives the read request (e.g., on read miss from the cache or other cases described above). If the source track is valid (e.g., Trk is greater than or equal to DevT and DevET), the source track is read. Otherwise, the back-end adapter locates the source track using a LOCATE_SOURCE_TRACK( ) function or command by proceeds to steps 622 through 644 of the FIG. 6 processing flow.

In step 622, a determination is made as to whether: (i) Trk is greater than DevT; and (ii) Trk is greater than DevET or no protection bit is set, e.g., whether (Trk≥DevT) AND ((Trk≥DevET) OR (no protection bit is set)), where "OR" denotes a logical or operation. If the result of the step 622 determination is yes, the flow continues to step 624, where the target track is valid and used to service the read request. If the result of the step 622 determination is no, the flow continues to step 626.

In step 626, a determination is made as to whether: (i) Trk is less than DevT; and (ii) Trk is greater than or equal to DevET or no protection bit is set, e.g., whether (Trk<DevT) AND ((Trk≥DevET) OR (no protection bit is set)). If the result of the step 626 determination is yes, the corresponding source track is located using the target link table in step 628. If the result of the step 626 determination is no, the flow continues to 630.

In step 630, a determination is made as to whether Trk is greater than or equal to DevT, Trk is less than DevET and the protection bit is set, e.g., whether (Trk≥DevT) AND (Trk<DevET) AND the protection bit is set. If the result of the step 630 determination is yes, the flow continues to step 632. In step 632, target extent nodes for the track for which the protection bit is set are read. Then, in step 634, the target extent node with the highest sequence number from the target extent nodes found in step 632 is used to find the corresponding source track. If the result of the step 630 determination is no, the flow continues to step 636.

In step 636, a determination is made as to whether Trk is less than DevT and DevET and a protection bit is set, e.g., whether (Trk<DevT) AND (Trk<DevET) AND the protection bit is set. The result of the step 636 determination should be yes, as all other cases should be handled via steps 622 through step 634, and thus proceeds to step 638. It should be appreciated, however, that the order of the flow may be altered, such that the determinations in steps 622, 626, 630 and 636 may be done in a different order, in which case there is a possibility that a "no" branch from step 636 would result in moving to a determination of one of steps 622, 626 and 630. In step 638, all target extent nodes for the track with the protection bit set are read, and the target link table is read. In step 640, the target extent node with the highest sequence number (LargestET) is found, along with the target link entry based on the target sequence number (LargestTT).

If LargestET is greater than LargestTT, the corresponding source track is found from the extent node in step 642. If LargestET is less than LargestTT, the corresponding source track is found from the target link table in step 644.

The source track may be made a full track by copying from the corresponding back-end cache, and the read miss tag in the cache header is updated with the device sequence number (e.g., maximum of DevT and DevET).

Asynchronous write intercept flow handling will now be described with respect to FIGS. 7A-7D, collectively referred to as FIG. 7. Asynchronous write intercept flow handling may be invoked on receiving host-level writes after a PIT snapshot is taken and acknowledged to the requesting host device (e.g., one of host devices 102 in FIG. 1), but before such an operation is fully de-staged on the back-end (e.g., to storage devices 110 in FIG. 1). Write commands should check if the current data owned by a particular logical storage volume has to be preserved, such as for a PIT snapshot of that logical storage volume or for an extent copy operation that is in progress, prior to applying the new write to the logical storage volume. If the track sequence number (e.g., in a track identifier table maintained in a global memory such as memory 114 of storage system 104-1) is smaller than one or more of the device sequence numbers (e.g., DevS, DevT, DevES, DevET) for the logical storage volume, the write is intercepted and the asynchronous write intercept flow handling is invoked.

Once invoked, an asynchronous intercept proceeds with the write and versions the new data. A version handling module is responsible for preserving the current or old data before applying the new data to the back-end track (e.g., on one of the storage devices 110 of storage system 104-1). FIG. 7 illustrates a pseudocode flow for preserving the current data as snapshot deltas (e.g., as RDPs), copying data to an extent target track, defining a target extent track (e.g., a SnapVX track), etc., before applying the new write.

In some embodiments, back-end or device adapters (e.g., device adapters 108 in storage system 104-1) handle intercept requests, and start from a track sequence number (Trk) to the highest device sequence number (e.g., among DevS, DevT, DevES and DevET) for the logical storage volume, denoted as variable DEV_SEQ. In step 702, a back-end adapter receives an intercept request. In step 704, a determination is made as to whether (Trk<DevS). If the result of the step 704 determination is yes, the flow proceeds to step 706, where the snapshot sequence table is read and a variable "NEXT_SRC_SEQ_NUM" is set to the lowest source sequence number (DevS) that needs to be handled.

After step 706, or if the result of the step 704 determination is no, the flow proceeds to step 708, where a determination is made as to whether (Trk<DevT). If the result of the step 708 determination is yes, the flow proceeds to step 710, where the target link table is read and a variable "NEXT_TGT_SEQ_NUM" is set to the lowest target sequence number (DevT) to be handled.

After step 710, or if the result of the step 708 determination is no, the flow proceeds to step 712, where a determination is made as to whether (Trk<DevES) AND a protection bit is set. If the result of the step 710 determination is yes, the flow proceeds to step 714, where source extent nodes are read and a variable "NEXT_EXT_SRC_SEQ_NUM" is set to the lowest source extent sequence that needs to be handled. If no source extent nodes are found, then the variable NEXT_EXT_SRC_SEQ_NUM is set to DEV_SEQ.

After step 714, or if the result of the step 712 determination is no, the flow proceeds to step 716, where a determination is made as to whether (Trk<DevET) AND a protection bit is set. If the result of the step 714 determination is yes, the flow proceeds to step 718, where target extent nodes are read and a variable "NEXT_EXT_TGT_SEQ_NUM" is set to the lowest target extent sequence that needs to be handled. If no target extent nodes are found, then NEXT_EXT_TGT_SEQ_NUM is set to DEV_SEQ.

After step 718, or if the result of the step 716 determination is no, the flow proceeds to step 720. In step 720, a loop is run starting from the current track sequence number (Trk) to the largest device sequence number (DEV_SEQ). A variable "indexS" is set to Trk in step 722. The flow then initiates a while loop in step 724, where while indexS is less than DEV_SEQ, the value of indexS is set to the lowest of the variables set in steps 706, 710, 714 and 718 (e.g., to the lowest of NEXT_SRC_SEQ_NUM, NEXT_TGT_SEQ_NUM, NEXT_EXT_SRC_SEQ_NUM and NEXT_EXT_TGT_SEQ_NUM). The flow then proceeds to step 726, where an intercept copy list is built. The intercept copy list includes a list of: (i) PIT snapshots of logical storage volumes that need the current track data (Trk); and (ii) extent copy operations that need the current track data (Trk). The flow then proceeds to step 728.

Figure 8:
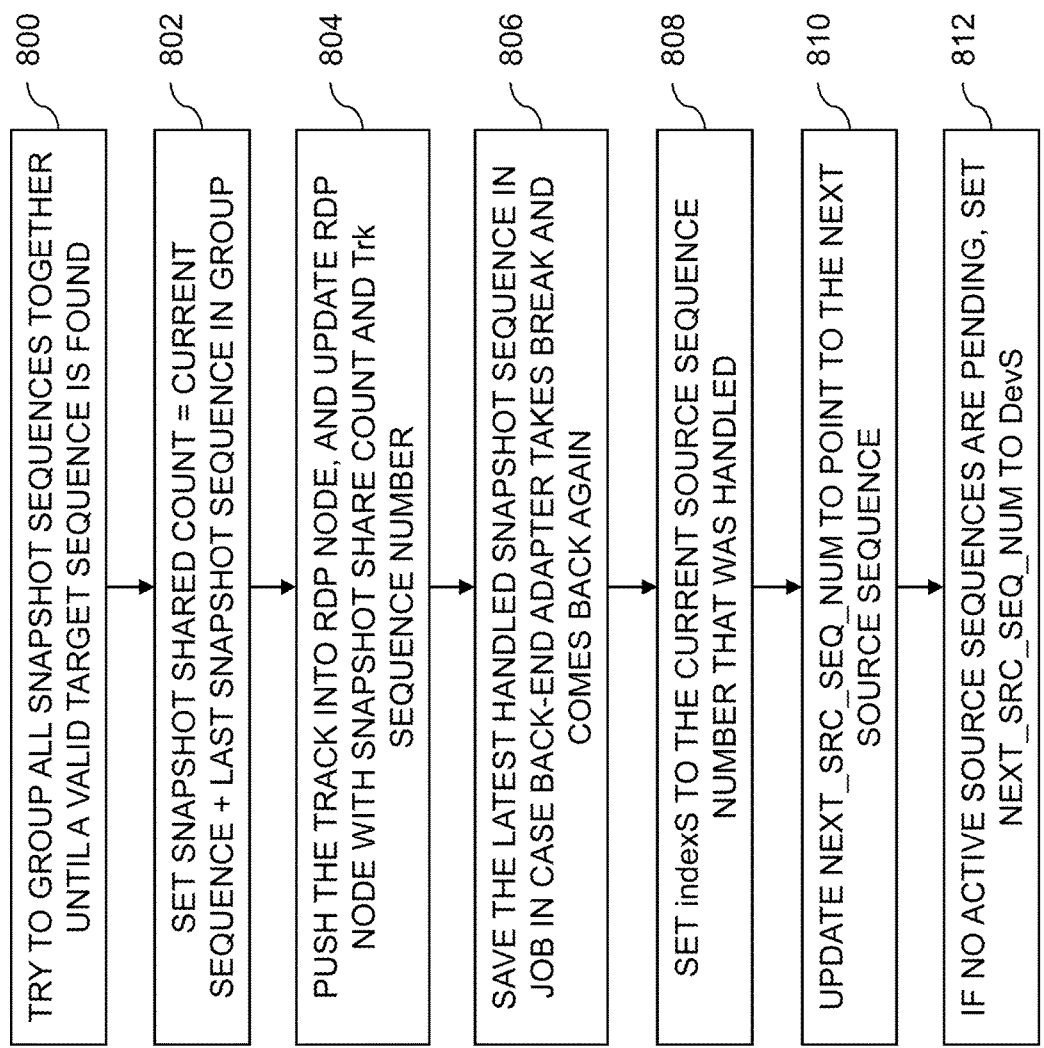
FIG. 8 depicts a processing flow for handling a source sequence number in an illustrative embodiment.

Steps 728 through 734 (with step 726) include handling source intercepts. More particularly, in step 728 a determination is made as to whether Trk is less than DevS and indexS is equal to NEXT_SRC_SEQ_NUM, e.g., whether (Trk<DevS) AND (indexS=NEXT_SRC_SEQ_NUM). If the result of the step 728 determination is yes, the flow proceeds to step 730 where the next source sequence number is handled. Handling the source sequence number in step 730 may utilize the process flow of FIG. 8, which includes steps 800 through 812.

In step 800, the flow attempts to group all snapshot sequences together until a valid target sequence is found, where a valid target sequence is a next target sequence, if one exists. Step 800 searches for the next DevT or DevET relationship that exists for the current track, and handling the range from NEXT_SRC_SEQ_NUM to the lower of {NEXT_TGT_SEQ_NUM, NEXT_EXT_TGT_SEQ_NUM}. In other words, step 800 tries to find the next spot in the timeline where the data would change as indicated by a DevT or DevET relationship for the track. That range of source relationships is grouped together in step 802 where a snapshot share count variable is set to the current sequence plus the last snapshot sequence in the group determined in step 800. In step 804, the track is pushed into an RDP node, and the RDP node is updated with the snapshot share count and Trk sequence number. The latest handled snapshot sequence job is saved in step 806 (e.g., in case a back-end adapter takes a break and comes back again). The variable indexS is set to the current source sequence number that was handled in step 808. The NEXT_SRC_SEQ_NUM variable is updated to point to the next source sequence in step 810. If there are no remaining active source sequences pending, the NEXT_SRC_SEQ_NUM variable is set to DevS in step 812. After completing the FIG. 8 flow, the FIG. 7 process may return from step 730 to step 724.

Figure 9:
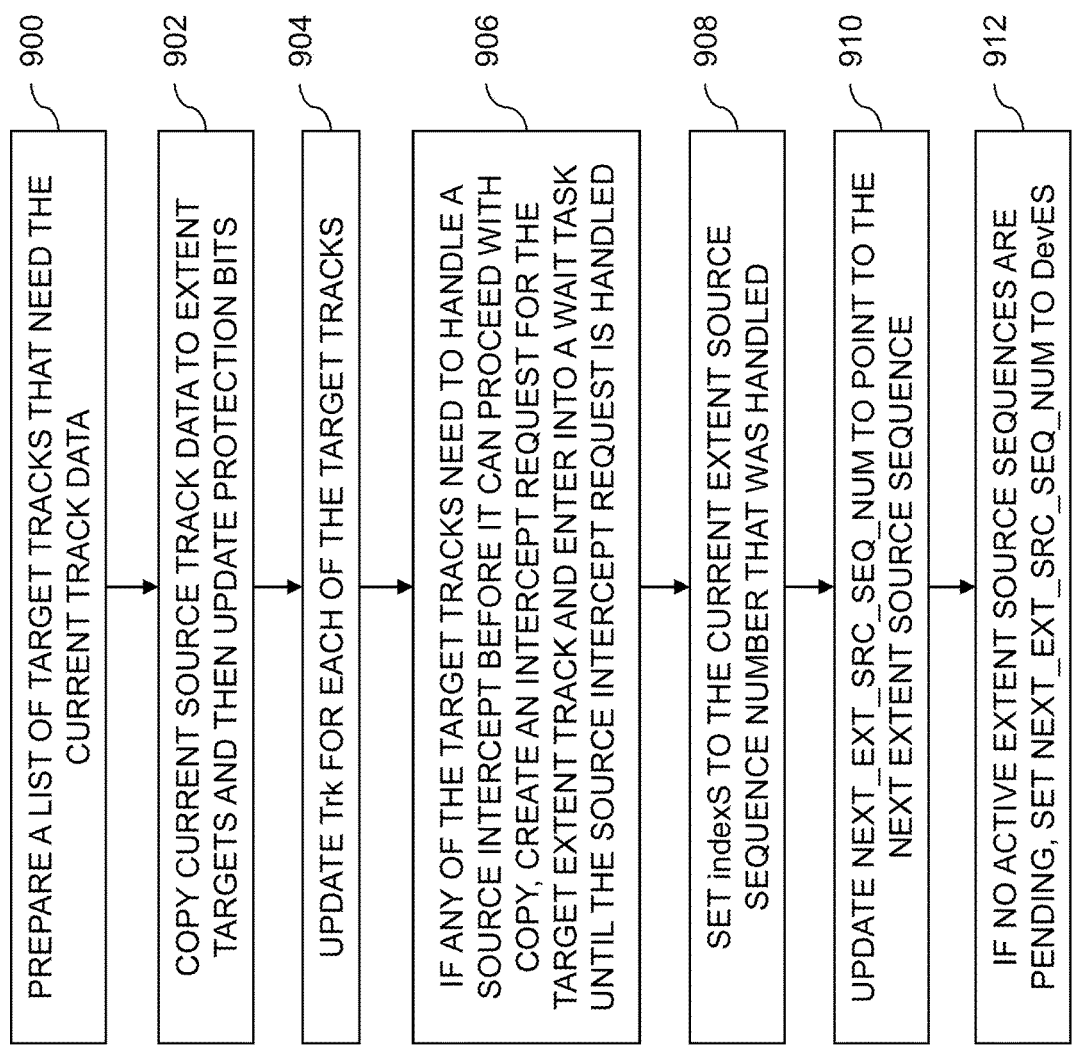
FIG. 9 depicts a processing flow for handling an extent source sequence number in an illustrative embodiment.

If the result of the step 728 determination is no, the flow proceeds to step 732 where a determination is made as to whether Trk is less than DevES and indexS is equal to NEXT_EXT_SRC_SEQ_NUM, e.g., whether (Trk<DevES) AND (indexS=NEXT_EXT_SRC_SEQ_NUM). If the result of the step 732 determination is yes, the flow proceeds to step 734 where the extent source sequence number is handled. Handling the extent source sequence number in step 734 may utilize the process flow of FIG. 9, which includes steps 900 through 912.

In step 900, a list of target tracks that need the current track data (Trk) is prepared. In step 902, the current source track data is copied to the extent targets in the list and protection bits are updated. The Trk for each of the extent targets to which the current source track data is copied is updated in step 904. In step 906, a determination is made as to whether any of the extent targets in the list need to handle a source intercept first before it can proceed with the copy operation in step 904. If so, an intercept request is created in step 906 and the FIG. 7 flow is re-invoked at step 728 and the FIG. 9 flow is placed into a wait task until the source intercept request on the target track is handled. This will wake the FIG. 9 flow and continue with finishing step 904. The variable indexS is set to the current extent source sequence number that was handled in step 908. The NEXT_EXT_SRC_SEQ_NUM variable is updated to point to the next active extent source sequence in step 910. If there are no remaining active extent source sequences, the NEXT_EXT_SRC_SEQ_NUM variable is set to DevES in step 912. After completing the FIG. 9 flow, the FIG. 7 process may return from step 734 to step 724.

If the result of the step 732 determination is no, the flow proceeds to step 736 where a determination is made as to whether indexS is equal to NEXT_TGT_SEQ_NUM or NEXT_EXT_TGT_SEQ_NUM, e.g., whether (indexS=NEXT_TGT_SEQ_NUM) OR (indexS=NEXT_EXT_TGT_SEQ_NUM). If the result of the step 736 determination is yes, the flow proceeds to step 738 where the next target sequence number or extent target sequence number to handle is picked up. If there are consecutive target sequences, or in cases where there are no source sequences in between two target sequences, then the latest target sequence will nullify any previously unhandled target sequences and it is safe to skip such unhandled target sequences.

Figure 10:
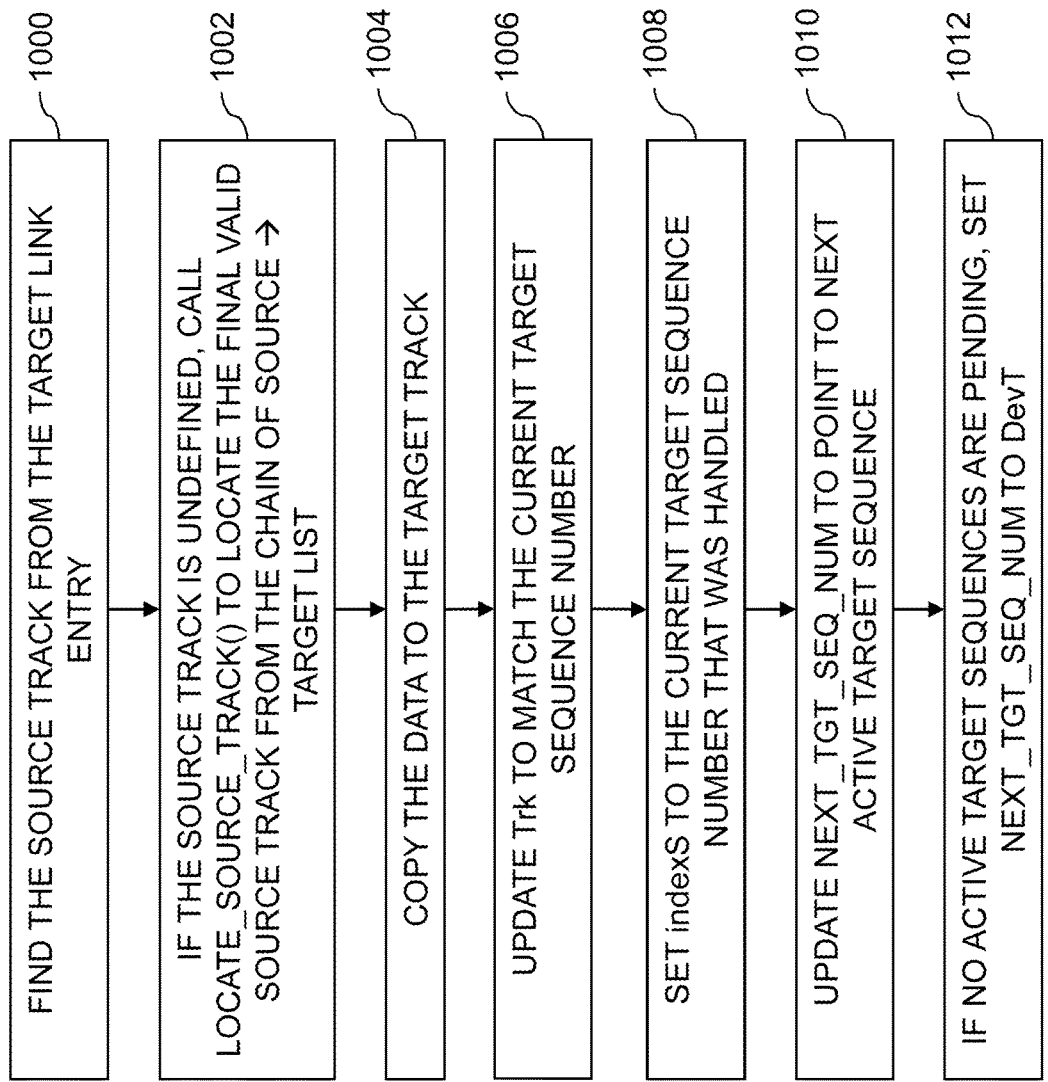
FIG. 10 depicts a processing flow for handling a target sequence number in an illustrative embodiment.

In step 740, a determination is made as to whether Trk is less than DevT and indexS is equal to NEXT_TGT_SEQ_NUM, e.g., whether (Trk<DevT) AND (indexS=NEXT_TGT_SEQ_NUM). If the result of the step 740 determination is yes, the flow proceeds to step 742 where the target sequence number is handled. Handling the target sequence number in step 742 may utilize the process flow of FIG. 10, which includes steps 1000 through 1012.

In step 1000, the source track is found from the target link entry. If the source track is undefined (e.g., not valid), the function LOCATE_SOURCE_TRACK( ) described above is invoked in step 1002 to locate the final valid source track from the chain of source to target list. The data is copied to the target track in step 1004. The value of Trk is updated to match the current target sequence number in step 1006. The variable indexS is set to the current target sequence number that was handled in step 1008. The NEXT_TGT_SEQ_NUM variable is updated to point to the next target sequence in step 1010. If there are no remaining active target sequences pending, the NEXT_TGT_SEQ_NUM variable is set to DevT in step 1012. After completing the FIG. 10 flow, the FIG. 7 process may return from step 742 to step 724.

Figure 11:
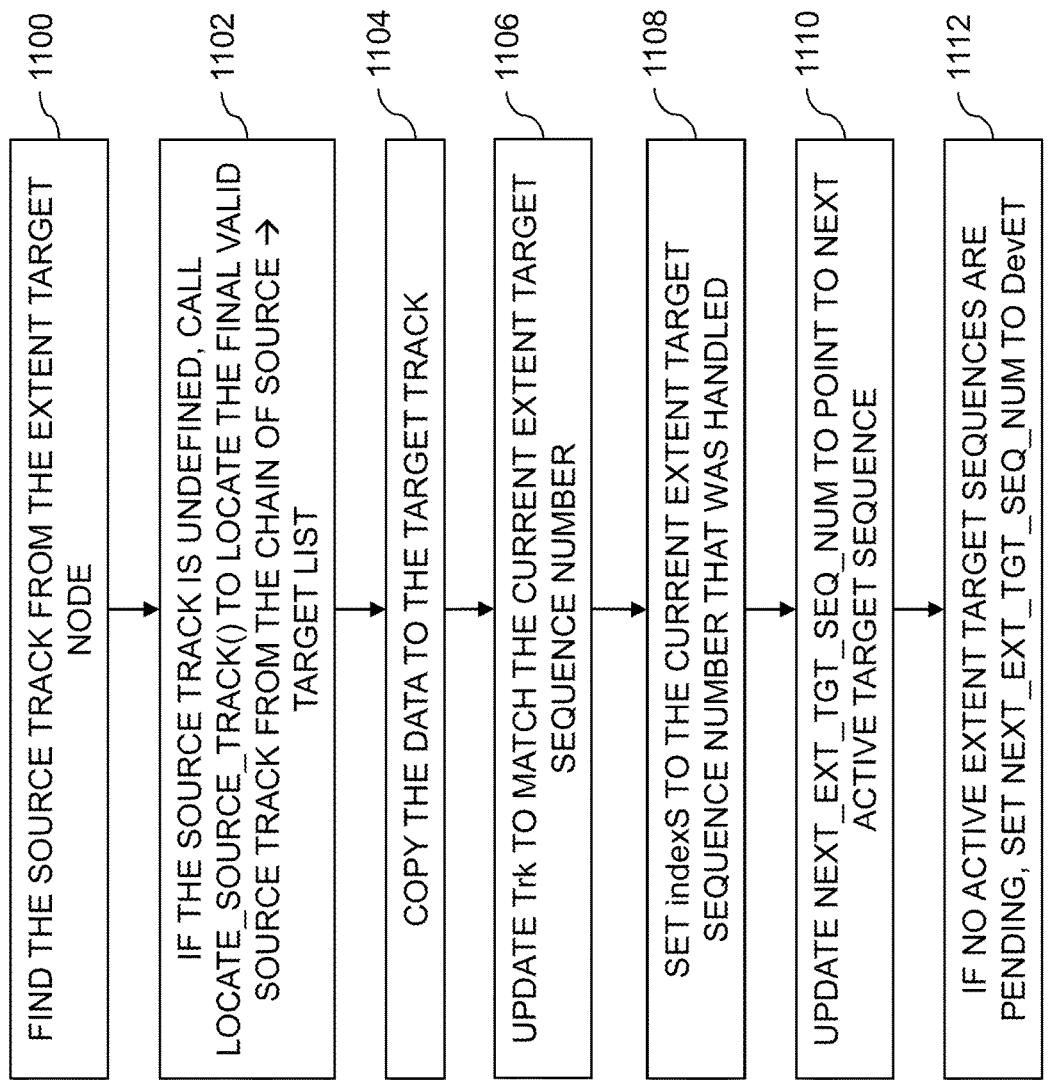
FIG. 11 depicts a processing flow for handling an extent target sequence number in an illustrative embodiment.

If the result of the step 740 determination is no, the flow proceeds to step 744 where a determination is made as to whether Trk is less than DevET and indexS is equal to NEXT_EXT_TGT_SEQ_NUM, e.g., whether (Trk<DevET) AND (indexS=NEXT_EXT_TGT_SEQ_NUM). If the result of the step 744 determination is yes, the flow proceeds to step 746 where the extent target sequence is handled. Handling the extent target sequence number in step 746 may utilize the process flow of FIG. 11, which includes steps 1100 through 1112.

In step 1100, the source track is found from the extent target node. If the source track is undefined (e.g., not valid), the function LOCATE_SOURCE_TRACK( ) described above is invoked in step 1102 to locate the final valid source track from the chain of source to target list. The data is copied to the target track in step 1104. The value of Trk is updated to match the current extent target sequence number in step 1106. The variable indexS is set to the current extent target sequence number that was handled in step 1108. The NEXT_EXT_TGT_SEQ_NUM variable is updated to point to the next target sequence in step 1110. If there are no remaining active target sequences pending, the NEXT_EXT_ TGT_SEQ_NUM variable is set to DevET in step 1112. After completing the FIG. 11 flow, the FIG. 7 process may return from step 746 to step 724.

The FIG. 7 process may repeatedly return to step 724 until the while loop is completed, e.g., until (indexS≥DEV_SEQ). At this point, the FIG. 7 flow is completed.

Advantageously, embodiments provide support for taking snapshots while extent copy operations are in progress, and for running extent copy operations on existing snapshotted source and target logical storage volumes. Embodiments also reduce the metadata space significantly, since multiple sequence numbers for each track do not need to be maintained in a track identifier table.

It is to be appreciated that the particular advantages described above and elsewhere herein are associated with particular illustrative embodiments and need not be present in other embodiments. Also, the particular types of information processing system features and functionality as illustrated in the drawings and described above are exemplary only, and numerous other arrangements may be used in other embodiments.

Illustrative embodiments of processing platforms utilized to implement functionality for processing I/O operations for logical storage volumes while snapshot and extent copy operations are in progress on the logical storage volumes will now be described in greater detail with reference to FIGS. 12 and 13. Although described in the context of system 100, these platforms may also be used to implement at least portions of other information processing systems in other embodiments.

Figure 12:
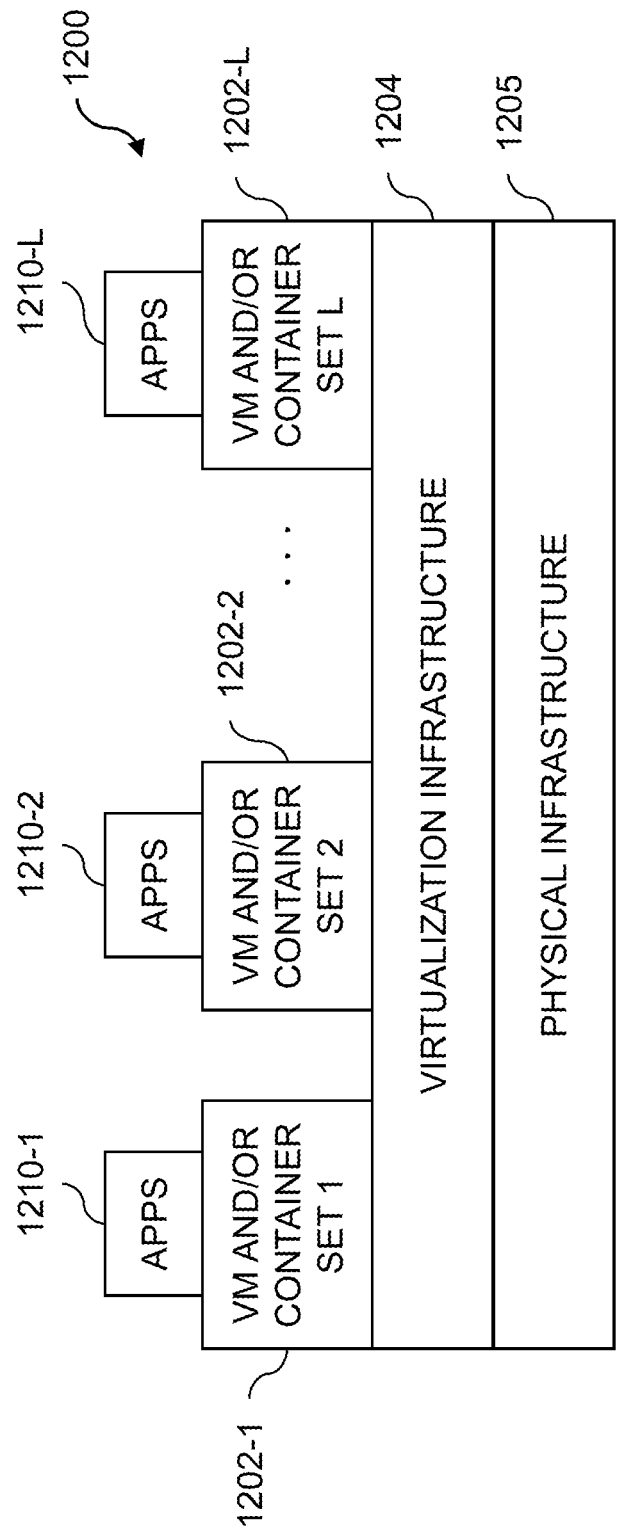
FIGS. 12 and 13 show examples of processing platforms that may be utilized to implement at least a portion of an information processing system in illustrative embodiments.
Figure 13:
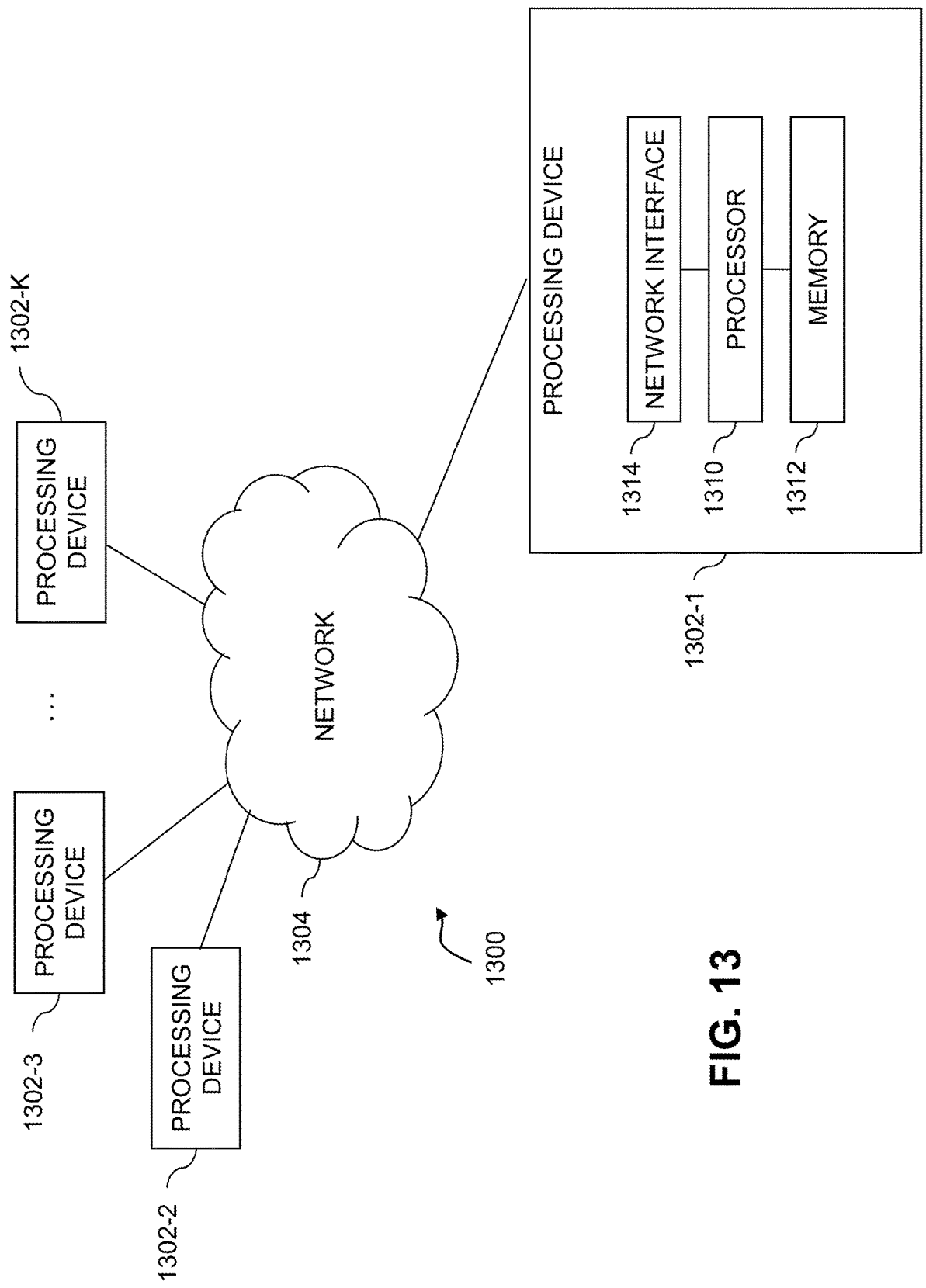

FIG. 12 shows an example processing platform comprising cloud infrastructure 1200. The cloud infrastructure 1200 comprises a combination of physical and virtual processing resources that may be utilized to implement at least a portion of the information processing system 100. The cloud infrastructure 1200 comprises multiple VMs and/or container sets 1202-1, 1202-2, . . . 1202-L implemented using virtualization infrastructure 1204. The virtualization infrastructure 1204 runs on physical infrastructure 1205, and illustratively comprises one or more hypervisors and/or operating system level virtualization infrastructure. The operating system level virtualization infrastructure illustratively comprises kernel control groups of a Linux operating system or other type of operating system.

The cloud infrastructure 1200 further comprises sets of applications 1210-1, 1210-2, . . . 1210-L running on respective ones of the VMs/container sets 1202-1, 1202-2, . . . 1202-L under the control of the virtualization infrastructure 1204. The VMs/container sets 1202 may comprise respective VMs, respective sets of one or more containers, or respective sets of one or more containers running in VMs.

In some implementations of the FIG. 12 embodiment, the VMs/container sets 1202 comprise respective VMs implemented using virtualization infrastructure 1204 that comprises at least one hypervisor. An example of a hypervisor platform that may be used to implement a hypervisor within the virtualization infrastructure 1204 is the VMware® vSphere® which may have an associated virtual infrastructure management system such as the VMware® vCenter™. The underlying physical machines may comprise one or more distributed processing platforms that include one or more storage systems.

In other implementations of the FIG. 12 embodiment, the VMs/container sets 1202 comprise respective containers implemented using virtualization infrastructure 1204 that provides operating system level virtualization functionality, such as support for Docker containers running on bare metal hosts, or Docker containers running on VMs. The containers are illustratively implemented using respective kernel control groups of the operating system.

As is apparent from the above, one or more of the processing modules or other components of system 100 may each run on a computer, server, storage device or other processing platform element. A given such element may be viewed as an example of what is more generally referred to herein as a "processing device." The cloud infrastructure 1200 shown in FIG. 12 may represent at least a portion of one processing platform. Another example of such a processing platform is processing platform 1300 shown in FIG. 13.

The processing platform 1300 in this embodiment comprises a portion of system 100 and includes a plurality of processing devices, denoted 1302-1, 1302-2, 1302-3, . . . 1302-K, which communicate with one another over a network 1304.

The network 1304 may comprise any type of network, including by way of example a global computer network such as the Internet, a WAN, a LAN, a satellite network, a telephone or cable network, a cellular network, a wireless network such as a WiFi or WiMAX network, or various portions or combinations of these and other types of networks.

The processing device 1302-1 in the processing platform 1300 comprises a processor 1310 coupled to a memory 1312.

The processor 1310 may comprise a microprocessor, a microcontroller, an application-specific integrated circuit (ASIC), a field-programmable gate array (FPGA), a central processing unit (CPU), a graphical processing unit (GPU), a tensor processing unit (TPU), a video processing unit (VPU) or other type of processing circuitry, as well as portions or combinations of such circuitry elements.

The memory 1312 may comprise random access memory (RAM), read-only memory (ROM), flash memory or other types of memory, in any combination. The memory 1312 and other memories disclosed herein should be viewed as illustrative examples of what are more generally referred to as "processor-readable storage media" storing executable program code of one or more software programs.

Articles of manufacture comprising such processor-readable storage media are considered illustrative embodiments. A given such article of manufacture may comprise, for example, a storage array, a storage disk or an integrated circuit containing RAM, ROM, flash memory or other electronic memory, or any of a wide variety of other types of computer program products. The term "article of manufacture" as used herein should be understood to exclude transitory, propagating signals. Numerous other types of computer program products comprising processor-readable storage media can be used.

Also included in the processing device 1302-1 is network interface circuitry 1314, which is used to interface the processing device with the network 1304 and other system components, and may comprise conventional transceivers.

The other processing devices 1302 of the processing platform 1300 are assumed to be configured in a manner similar to that shown for processing device 1302-1 in the figure.

Again, the particular processing platform 1300 shown in the figure is presented by way of example only, and system 100 may include additional or alternative processing platforms, as well as numerous distinct processing platforms in any combination, with each such platform comprising one or more computers, servers, storage devices or other processing devices.

For example, other processing platforms used to implement illustrative embodiments can comprise converged infrastructure such as VxRail™, VxRack™, VxRack™ FLEX, VxBlock™ or Vblock® converged infrastructure from Dell EMC.

It should therefore be understood that in other embodiments different arrangements of additional or alternative elements may be used. At least a subset of these elements may be collectively implemented on a common processing platform, or each such element may be implemented on a separate processing platform.

As indicated previously, components of an information processing system as disclosed herein can be implemented at least in part in the form of one or more software programs stored in memory and executed by a processor of a processing device. For example, at least portions of the functionality for processing I/O operations for logical storage volumes while snapshot and extent copy operations are in progress on the logical storage volumes as disclosed herein are illustratively implemented in the form of software running on one or more processing devices.

It should again be emphasized that the above-described embodiments are presented for purposes of illustration only. Many variations and other alternative embodiments may be used. For example, the disclosed techniques are applicable to a wide variety of other types of information processing systems, storage systems, storage devices, etc. Also, the particular configurations of system and device elements and associated processing operations illustratively shown in the drawings can be varied in other embodiments. Moreover, the various assumptions made above in the course of describing the illustrative embodiments should also be viewed as exemplary rather than as requirements or limitations of the disclosure. Numerous other alternative embodiments within the scope of the appended claims will be readily apparent to those skilled in the art.

What is claimed is:

1. An apparatus comprising:
    at least one processing device comprising a processor coupled to a memory;
    wherein the processing device is configured:
        to maintain a set of device sequence numbers for snapshot operations associated with each of two or more logical storage volumes of a storage system and extent copy operations associated with one or more extents of the two or more logical storage volumes, each extent comprising one or more tracks, each track comprising a sequential group of logical addresses of one of the two or more logical storage volumes;
        to maintain, for at least one track of the two or more logical storage volumes, a least one track sequence number representing the state of the at least one track with respect to the snapshot operations and extent copy operations associated with a corresponding one of the two or more logical storage volumes containing the at least one track;
        to receive one or more input/output operations directed to at least one of the two or more logical storage volumes from one or more host devices coupled to the storage system while at least one snapshot operation or extent copy operation for the two or more logical storage volumes is in progress; and
        to utilize the at least one track sequence number and the sets of device sequence numbers to determine processing of the received input/output operations while said at least one snapshot operation or extent copy operation is in progress.

2. The apparatus of claim 1 wherein maintaining the at least one track sequence number comprises maintaining a track identifier table for a given one of the two or more logical storage volumes, the track identifier table comprising an entry for each track of the given logical storage volume, a given entry for a given one of the tracks of the given logical storage volume comprising:
    the track sequence number for the given track;
    a device sequence number of track data for the given track held in a cache of the storage system; and
    a protection bit indicating whether the given track is covered by one or more in-progress extent copy operations.

3. The apparatus of claim 1 wherein the processing device is further configured to maintain a replication data pointer table comprising one or more replication data pointer entries, a given replication data pointer entry associated with a given track of a given one of the two or more logical storage volumes comprising:
- a source track sequence number at a time of a write to the given track;
- a number of snapshots sharing the source track sequence number; and
- a location of point-in-time data for the given track at the time of the write to the given track in one or more physical storage devices of the storage system.

4. The apparatus of claim 1 wherein the set of device sequence numbers for a given one of the two or more logical storage volumes comprises:
- a source sequence number that is incremented when a snapshot of the given logical storage volume is taken;
- a target sequence number that is incremented when the given logical storage volume is linked to a snapshot of another one of the two or more logical storage volumes;
- a source extent sequence number that is incremented when an extent copy operation with a source extent on the given logical storage volume is initiated; and
- a target extent sequence number that is incremented when an extent copy operation with a target extent on the given logical storage volume is initiated.

5. The apparatus of claim 4 wherein incrementing a given one of the set of device sequence numbers comprises setting a value of the given device sequence number to a value larger than a current largest value among the set of device sequence numbers for the given logical storage volume.

6. The apparatus of claim 4 wherein the processing device is further configured to maintain a target link table comprising one or more target link entries, a given target link entry associated with a given snapshot of a source one of the two or more logical storage volumes comprising:
- a source sequence number of the source logical storage volume at a time of linking the given snapshot of the source logical storage volume to a target one of the two or more logical storage volumes; and
- a target sequence number of the target logical storage volume at the time of linking the given snapshot of the source logical storage volume to the target logical storage volume.

7. The apparatus of claim 4 wherein the processing device is further configured to maintain extent source and target nodes for extent copy operations, a given one of the extent source and target nodes for a given extent copy operation associated with a given extent comprising:
- a size of the given extent;
- start and end tracks of the given extent on a source one of the two or more logical storage volumes and a target one of the two or more logical storage volumes;
- a source extent sequence number for the source logical storage volume; and
- a target extent sequence number for the target logical storage volume.

8. The apparatus of claim 1 wherein a given one of the input/output operations comprises a read operation directed to a given track of a given one of the two or more logical storage volumes, and wherein utilizing the at least one track sequence number and the sets of device sequence numbers to determine processing of the read operation directed to the given track comprises:
- determining if the given track is in a cache accessible by a host adapter of the storage system that received the read operation; and
- utilizing the cache to service the read operation responsive to at least one of:
  - determining that the given track is in the cache and the track sequence number of the given track is greater than or equal to both the target sequence number of the given logical storage volume and the target extent sequence number of the given logical storage volume; and
  - determining that a read miss tag is set for the given track, reading a cache header sequence number for the given track, and determining that the cache header sequence number for the given track is greater than or equal to both the target sequence number of the given logical storage volume and the target extent sequence number of the given logical storage volume.

9. The apparatus of claim 1 wherein a given one of the input/output operations comprises a read operation directed to a given track of a given one of the two or more logical storage volumes, and wherein utilizing the at least one track sequence number and the sets of device sequence numbers to determine processing of the read operation directed to the given track comprises:
- determining that the given track is at least one of: not in a cache accessible by a host adapter of the storage system that received the read operation; and a version of the given track in the cache is not a valid source track; and
- locating a valid source track for the given track utilizing a back-end adapter coupled to one or more storage devices of the storage system.

10. The apparatus of claim 9 wherein locating the valid source track comprises:
- using a target track when: the track sequence number is greater than or equal to the target sequence number; and the track sequence number is greater than or equal to the target extent sequence number or no protection bit is set;
- using a target link table when: the track sequence number is less than the target sequence number; and the track sequence number is greater than or equal to the target extent sequence number or no protection bit is set;
- using a target extent node with a highest sequence number among target extent nodes for the given track when: the track sequence number is greater than or equal to the target sequence number; the track sequence number is less than the target extent sequence number; and the protection bit is set;
- using the target extent node with the highest sequence number among the target extent nodes for the given track when: the track sequence number is less than the target sequence number; the track sequence number is less than the target extent sequence number; the protection bit is set; and the target extent node with the highest sequence number among the target extent nodes for the given track is greater than a target link entry with the highest sequence number among target link entries of a target link table for the given track; and
- using the target link entry with the highest sequence number among the target link entries of the target link table for the given track when: the track sequence number is less than the target sequence number; the track sequence number is less than the target extent sequence number; the protection bit is set; and the target extent node with the highest sequence number among the target extent nodes for the given track is less than the target link entry with the highest sequence number among the target link entries of the target link table for the given track.

11. The apparatus of claim 1 wherein a given one of the input/output operations comprises a write operation directed to a given track of a given one of the two or more logical storage volumes that has one or more snapshot and extent copy operations in progress, and wherein utilizing the at least one track sequence number and the sets of device sequence numbers to determine processing of the write operation directed to the given track comprises:
  setting a first variable to a lowest source sequence number yet to be processed for the given logical storage volume responsive to determining that the track sequence number of the given track is less than a current value the source sequence number of the given logical storage volume;
  setting a second variable to a lowest target sequence number yet to be processed for the given logical storage volume responsive to determining that the track sequence number of the given track is less than a current value of the target sequence number of the given logical storage volume;
  setting a third variable to a lowest source extent sequence number yet to be processed for the given logical storage volume responsive to determining that the track sequence number of the given track is less than a current value of the source extent sequence number of the given logical storage volume;
  setting a fourth variable to a lowest target extent sequence number yet to be processed for the given logical storage volume responsive to determining that the track sequence number of the given track is less than a current value of the target extent sequence number of the given logical storage volume; and
  running a loop starting from the current track sequence number to a largest one of the set of device sequence numbers of the given logical storage volume to preserve track data of the given track prior to applying the write operation for the given track to the given logical storage volume.

12. The apparatus of claim 11 wherein running the loop comprises:
  setting a fifth variable to a lowest current value among the first, second, third and fourth variables;
  processing a next source sequence number responsive to determining that the track sequence number of the given track is less than the source sequence number and the fifth variable is equal to the first variable;
  processing a next target sequence number responsive to determining that the track sequence number of the given track is less than the target sequence number and the fifth variable is equal to the second variable;
  processing a next source extent sequence number responsive to determining that the track sequence number of the given track is less than the source extent sequence number and the fifth variable is equal to the third variable; and
  processing a next target extent sequence number responsive to determining that the track sequence number of the given track is less than the target extent sequence number and the fifth variable is equal to the fourth variable.

13. The apparatus of claim 12 wherein processing the next source sequence number comprises:
  grouping together snapshot sequences until a valid target snapshot sequence is found;
  setting a snapshot share count variable to a current snapshot sequence number plus a last snapshot sequence number in the group of snapshot sequences;
  pushing current track data to a replication data pointer node;
  updating the replication data pointer node with the snapshot share count and the track sequence number;
  setting the fifth variable to a current source sequence number corresponding to the valid target snapshot sequence; and
  updating the first variable to a next source sequence number or, if there are no remaining active source sequences pending, to a highest one of the set of device sequence numbers.

14. The apparatus of claim 12 wherein processing the next target sequence number comprises:
  locating a source track from a target link entry or a chain of source to target listing;
  copying the current track data to a target track;
  updating a value of the track sequence number to match a current target sequence number;
  setting the fifth variable to the current target sequence number; and
  updating the second variable to a next target sequence number or, if there are no remaining active target sequences pending, to a highest one of the set of device sequence numbers.

15. The apparatus of claim 12 wherein processing the next source extent sequence number comprises:
  preparing a list of extent target tracks the need current track data for the given track;
  copying the current source track data to the extent target tracks in the list and updating protection bits for the extent target tracks in the list;
  setting the fifth variable to a current extent source sequence number; and
  updating the third variable to a next source extent sequence number or, if there are no remaining active source extent sequences pending, to a highest one of the set of device sequence numbers.

16. The apparatus of claim 12 wherein processing the next target extent sequence number comprises:
  locating a source track from an extent target node or a chain of source to target listing;
  copying the current source track data to a target extent track;
  setting the fifth variable to a current extent target sequence number; and
  updating the fourth variable to a next target extent sequence number or, if there are no remaining active target extent sequences pending, to a highest one of the set of device sequence numbers.

17. A method comprising:
  maintaining a set of device sequence numbers for snapshot operations associated with each of two or more logical storage volumes of a storage system and extent copy operations associated with one or more extents of the two or more logical storage volumes, each extent comprising one or more tracks, each track comprising a sequential group of logical addresses of one of the two or more logical storage volumes;
  maintaining, for at least one track of the two or more logical storage volumes, a track sequence number representing the state of the at least one track with respect to the snapshot operations and extent copy operations associated with a corresponding one of the two or more logical storage volumes containing the at least one track;

receiving one or more input/output operations directed to at least one of the two or more logical storage volumes from one or more host devices coupled to the storage system while at least one snapshot operation or extent copy operation for the two or more logical storage volumes is in progress; and utilizing the at least one track sequence number and the sets of device sequence numbers to determine processing of the received input/output operations while said at least one snapshot operation or extent copy operation is in progress;

wherein the method is performed by at least one processing device comprising a processor coupled to a memory.

18. The method of claim 17 wherein:

the set of device sequence numbers for a given one of the two or more logical storage volumes comprises:
- a source sequence number that is incremented when a snapshot of the given logical storage volume is taken;
- a target sequence number that is incremented when the given logical storage volume is linked to a snapshot of another one of the two or more logical storage volumes;
- a source extent sequence number that is incremented when an extent copy operation with a source extent on the given logical storage volume is initiated; and
- a target extent sequence number that is incremented when an extent copy operation with a target extent on the given logical storage volume is initiated; and incrementing a given one of the set of device sequence numbers comprises setting a value of the given device sequence number to a value larger than a current largest value among the set of device sequence numbers for the given logical storage volume.

19. A computer program product comprising a non-transitory processor-readable storage medium having stored therein program code of one or more software programs, wherein the program code when executed by at least one processing device causes the at least one processing device:

to maintain a set of device sequence numbers for snapshot operations associated with each of two or more logical storage volumes of a storage system and extent copy operations associated with one or more extents of the two or more logical storage volumes, each extent comprising one or more tracks, each track comprising a sequential group of logical addresses of one of the two or more logical storage volumes;

to maintain, for at least one track of the two or more logical storage volumes, a track sequence number representing the state of the at least one track with respect to the snapshot operations and extent copy operations associated with a corresponding one of the two or more logical storage volumes containing the at least one track;

to receive one or more input/output operations directed to at least one of the two or more logical storage volumes from one or more host devices coupled to the storage system while at least one snapshot operation or extent copy operation for the two or more logical storage volumes is in progress; and to utilize the at least one track sequence number and the sets of device sequence numbers to determine processing of the received input/output operations while said at least one snapshot operation or extent copy operation is in progress.

20. The computer program product of claim 19 wherein:

the set of device sequence numbers for a given one of the two or more logical storage volumes comprises:
- a source sequence number that is incremented when a snapshot of the given logical storage volume is taken;
- a target sequence number that is incremented when the given logical storage volume is linked to a snapshot of another one of the two or more logical storage volumes;
- a source extent sequence number that is incremented when an extent copy operation with a source extent on the given logical storage volume is initiated; and
- a target extent sequence number that is incremented when an extent copy operation with a target extent on the given logical storage volume is initiated; and incrementing a given one of the set of device sequence numbers comprises setting a value of the given device sequence number to a value larger than a current largest value among the set of device sequence numbers for the given logical storage volume.

* * * * *